United States Patent
Malladi et al.

(10) Patent No.: US 8,300,582 B2
(45) Date of Patent: Oct. 30, 2012

(54) UPLINK ACK TRANSMISSION FOR SDMA IN A WIRELESS COMMUNICATION SYSTEM

(75) Inventors: Durga Prasad Malladi, San Diego, CA (US); Byoung-Hoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 770 days.

(21) Appl. No.: 12/439,727

(22) PCT Filed: Oct. 2, 2007

(86) PCT No.: PCT/US2007/080200
§ 371 (c)(1),
(2), (4) Date: Jun. 8, 2009

(87) PCT Pub. No.: WO2008/042904
PCT Pub. Date: Apr. 10, 2008

(65) Prior Publication Data
US 2010/0182975 A1 Jul. 22, 2010

Related U.S. Application Data

(60) Provisional application No. 60/849,588, filed on Oct. 4, 2006.

(51) Int. Cl.
*H04W 4/00* (2009.01)
(52) U.S. Cl. .......................... 370/329; 455/450
(58) Field of Classification Search .................. 370/230, 370/329, 330, 331, 332, 333, 334, 335, 336, 370/337; 455/450, 451, 452, 453, 454
See application file for complete search history.

(56) References Cited

U.S. PATENT DOCUMENTS 5,418,571 A 5/1995 Ghanbari
(Continued)

FOREIGN PATENT DOCUMENTS

JP 2004222241 A 8/2004
(Continued)

OTHER PUBLICATIONS

Classon, et al.: "Overview of UMTS Air-Interface Evolution" Vehicular Technology Conference, 2006. VTC-2006 Fall, 2006 IEEE 64th, IEEE, PI, Sep. 1, 2006, pp. 1-5, XP002479511 ISBN: 978-1-4244-0062-1.

(Continued)

*Primary Examiner* — Kibrom T Hailu
*Assistant Examiner* — Dady Chery
(74) *Attorney, Agent, or Firm* — Liem T. Do

(57) ABSTRACT

Techniques for transmitting acknowledgement (ACK) information in a wireless communication system are described. The system supports data transmission to multiple user equipments (UEs) on the same downlink resources with spatial division multiple access (SDMA). A base station sends a data transmission with multiple (M) layers to M UEs. The downlink resources used for the data transmission are associated with ACK resources used to send ACK information for the data transmission. The ACK resources may be partitioned into M portions, e.g., based on frequency division multiplexing (FDM). Each of the M layers is associated with a respective portion of the ACK resources. A recipient UE for each layer sends ACK for that layer on the associated portion of the ACK resources. For each ACK resource portion, one or more pilot symbols may be sent on one or more resource elements, and ACK symbols may be sent on remaining resource elements.

36 Claims, 20 Drawing Sheets

U.S. PATENT DOCUMENTS

| | | | |
|---|---|---|---|
| 2005/0052991 A1 | 3/2005 | Kadous | |
| 2005/0195732 A1* | 9/2005 | Huh et al. | 370/206 |
| 2005/0208945 A1* | 9/2005 | Hong et al. | 455/436 |
| 2006/0142041 A1 | 6/2006 | Tomasin et al. | |
| 2007/0258540 A1* | 11/2007 | Ratasuk et al. | 375/267 |
| 2008/0080434 A1* | 4/2008 | Wolf et al. | 370/338 |

FOREIGN PATENT DOCUMENTS

| | | |
|---|---|---|
| KR | 1020050088817 | 7/2005 |
| KR | 1020050089554 | 8/2005 |
| KR | 1020050114656 | 12/2005 |
| KR | 100828801 | 5/2008 |
| RU | 2120702 C1 | 10/1998 |
| RU | 2175464 C1 | 10/2001 |
| WO | WO0007260 A2 | 2/2000 |
| WO | WO02099978 A2 | 12/2002 |
| WO | WO2004084450 | 9/2004 |
| WO | WO2005025117 | 3/2005 |
| WO | WO2006071049 A1 | 7/2006 |
| WO | WO2006071760 | 7/2006 |
| WO | WO2006099547 A1 | 9/2006 |

OTHER PUBLICATIONS

Qualcomm Europe: "Considerations on Multiplexing of Control and User Data for xFDMA Based E-Utra Uplink Evaluation" TSG-RAN Working Group 1 Meeting, XX, XX, No. R1-051102 Oct. 10, 2005, pp. 1-6, XP002446638.

International Search Report—PCT/US2007/080200—International Search Authority, European Patent Office, May 26, 2008.

Written Opinion—PCT/US2007/080200—International Search Authority, European Patent Office, May 26, 2008.

Taiwan Search Report—TW096137317—TIPO—Mar. 3, 2012.

* cited by examiner

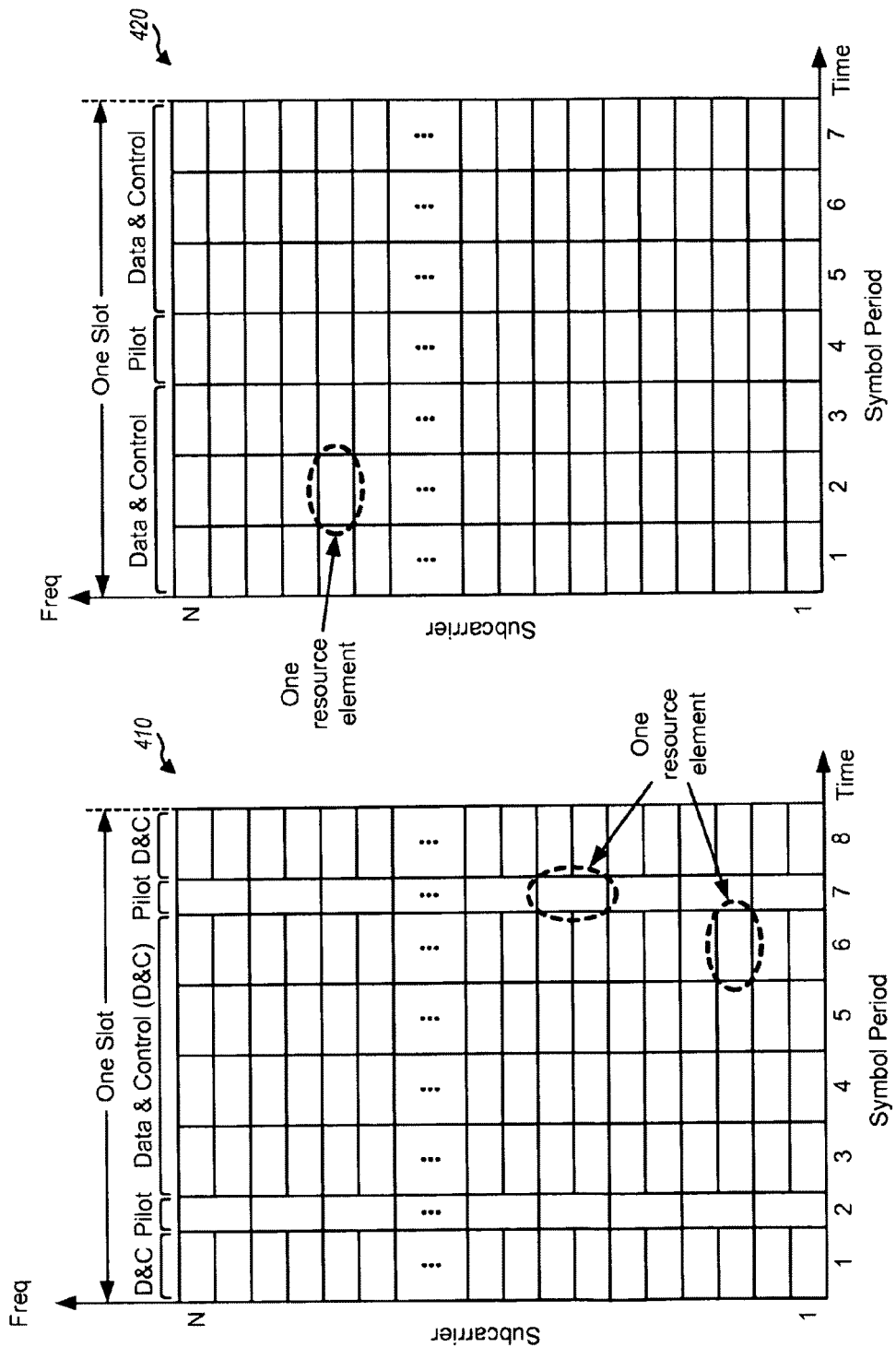

SU-MIMO
M layers (or packets) transmitted simultaneously to one UE

SDMA
M layers (or packets) transmitted simultaneously to M UEs

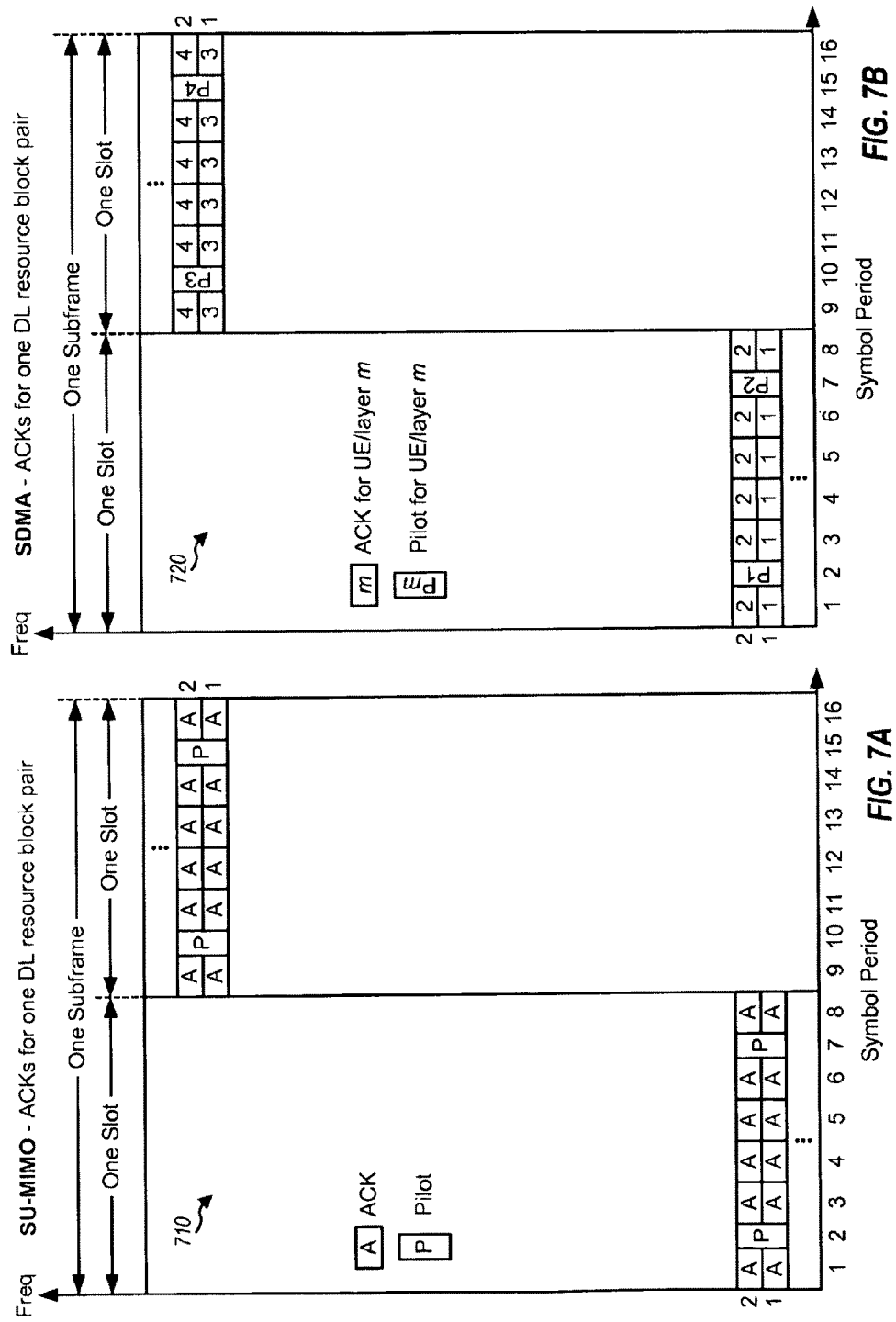

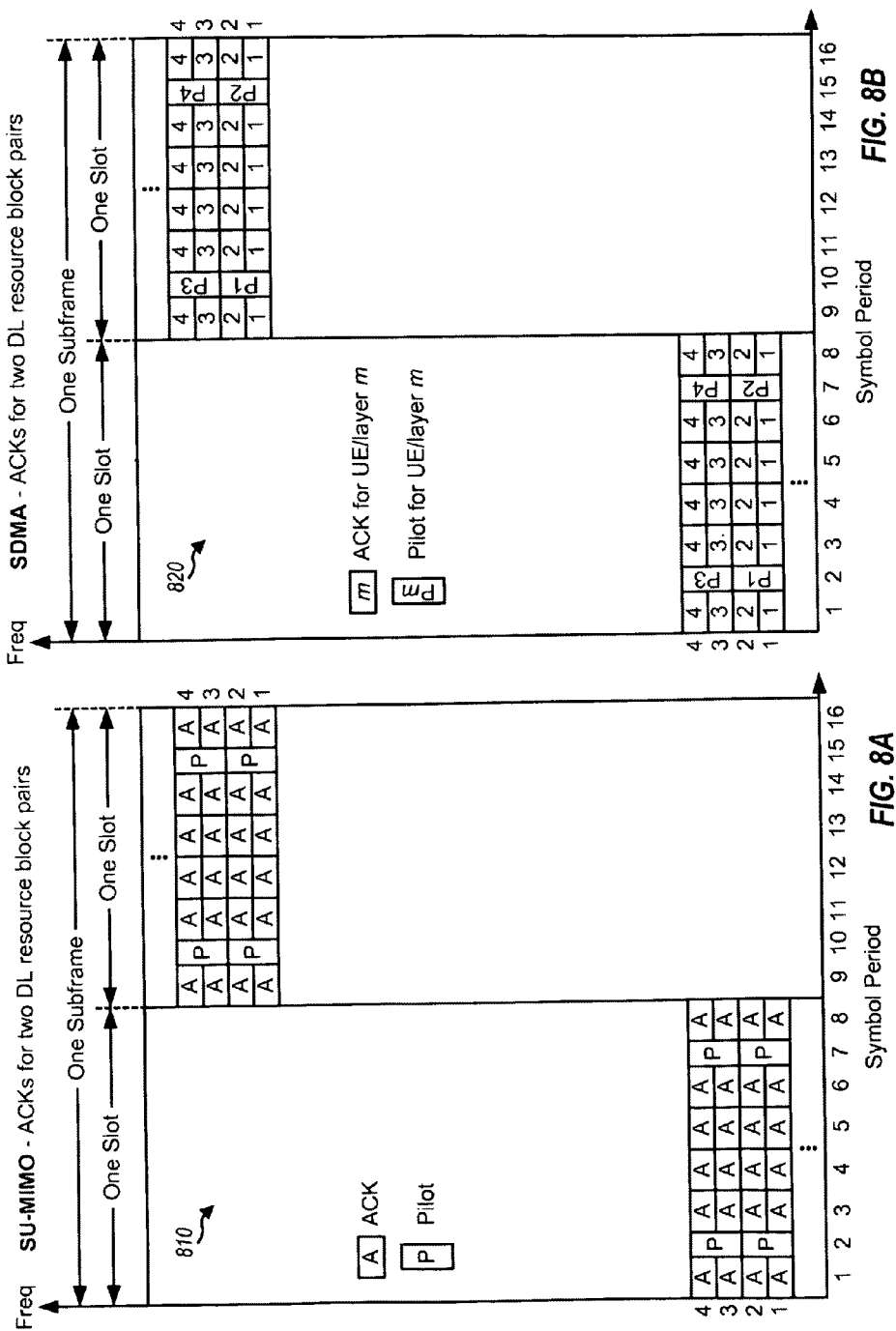

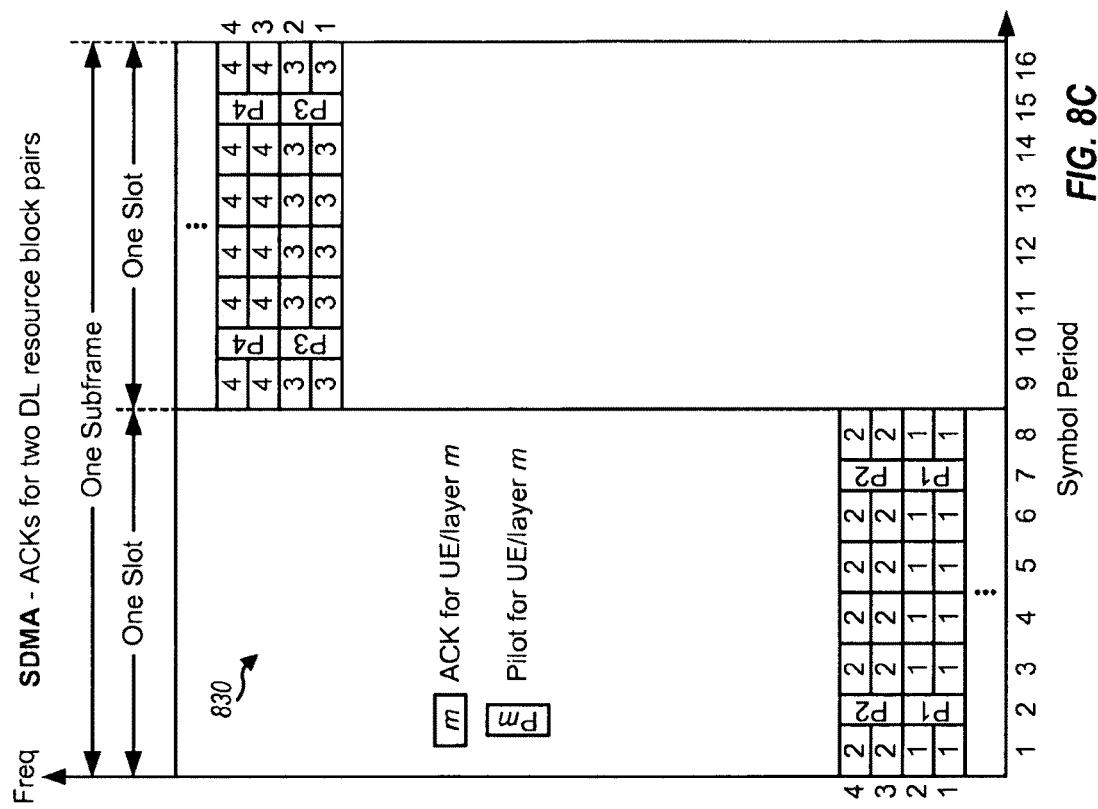

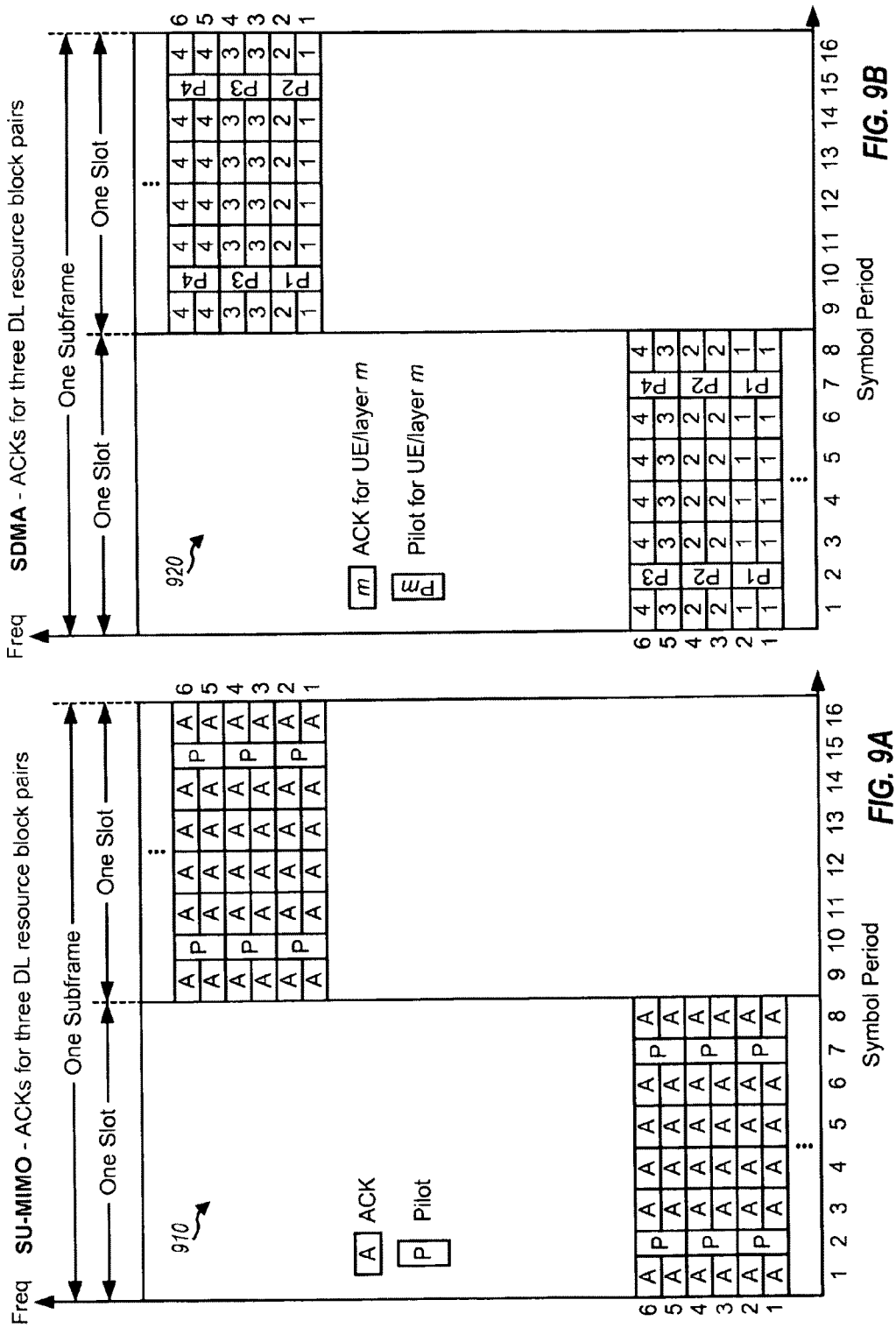

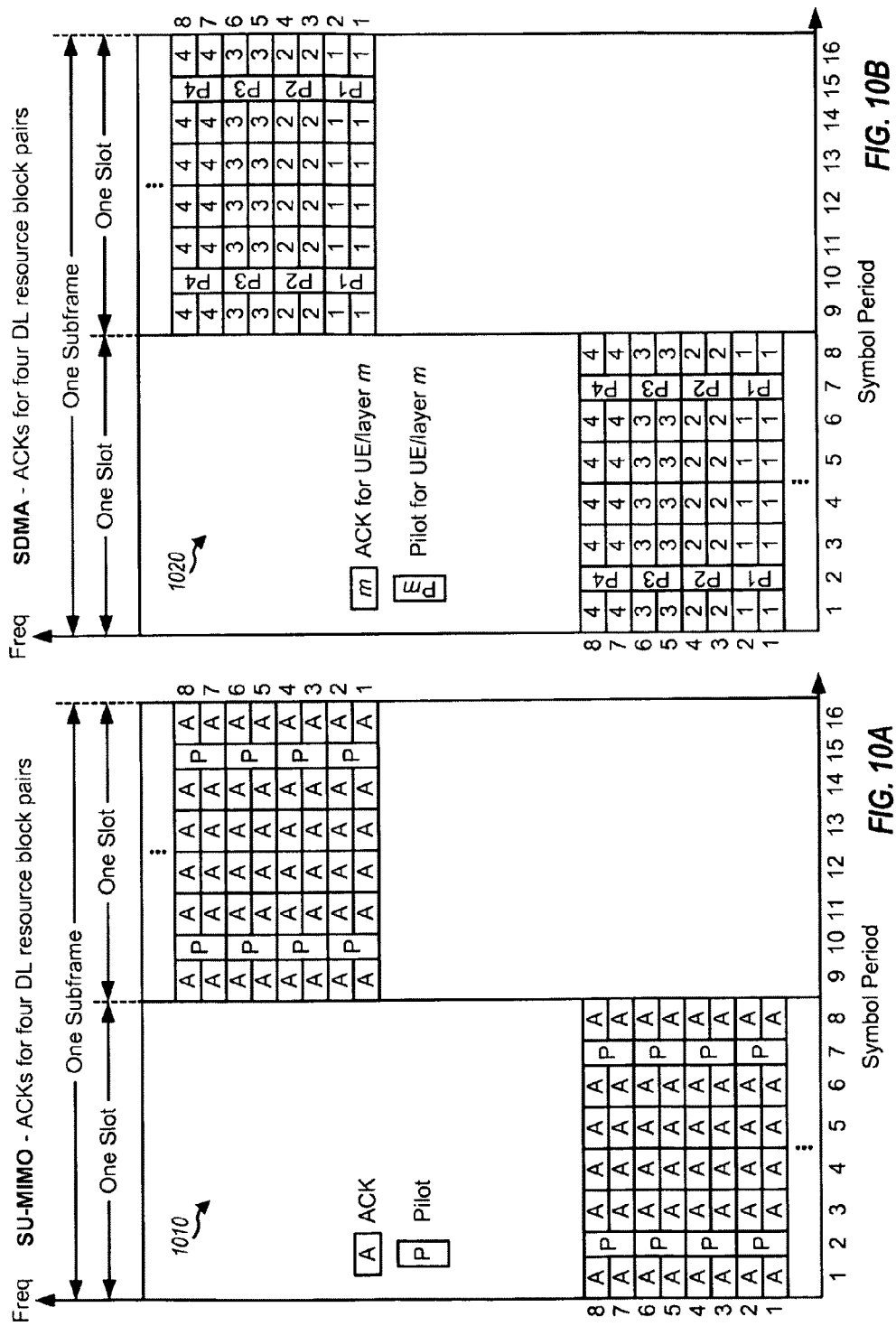

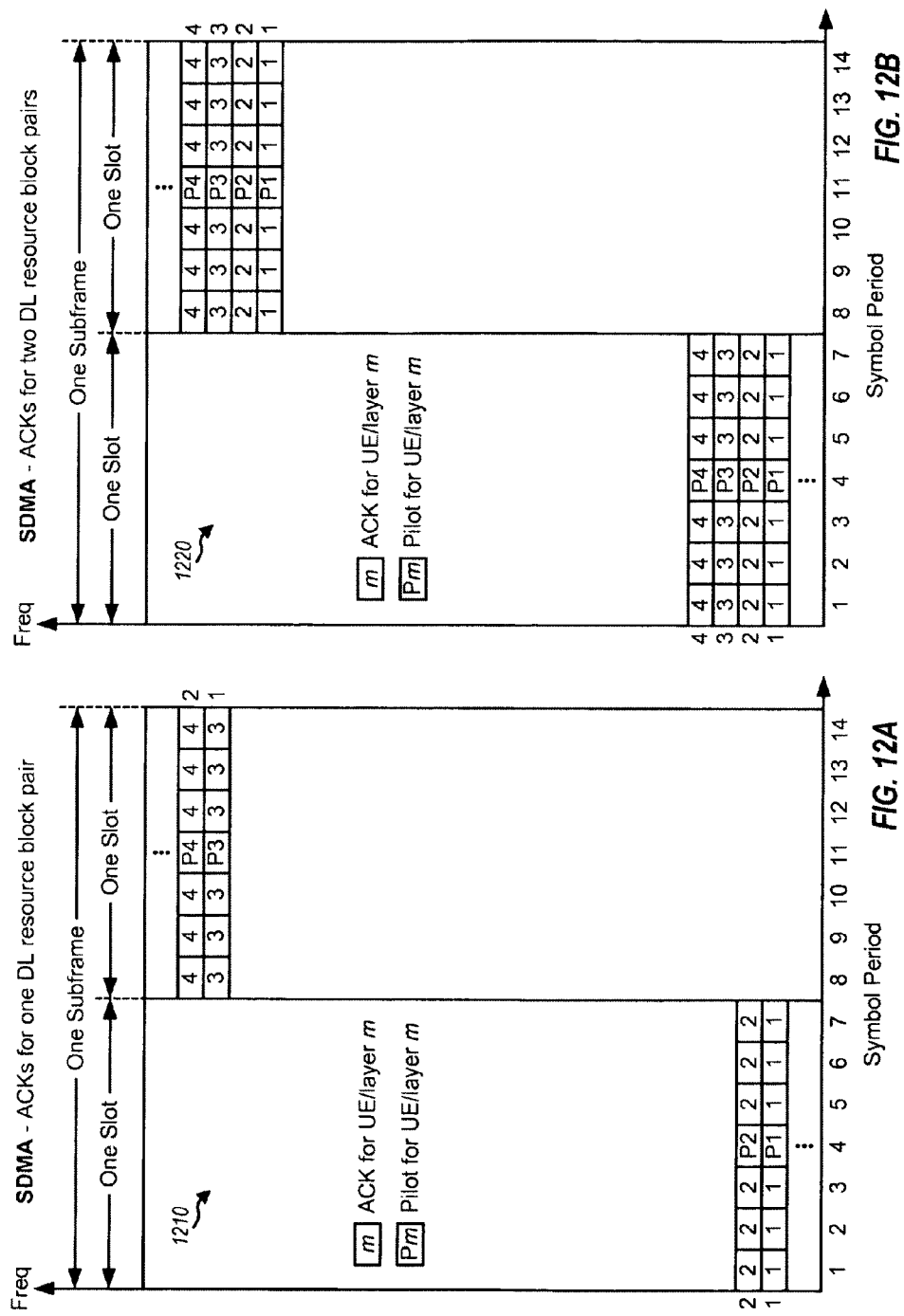

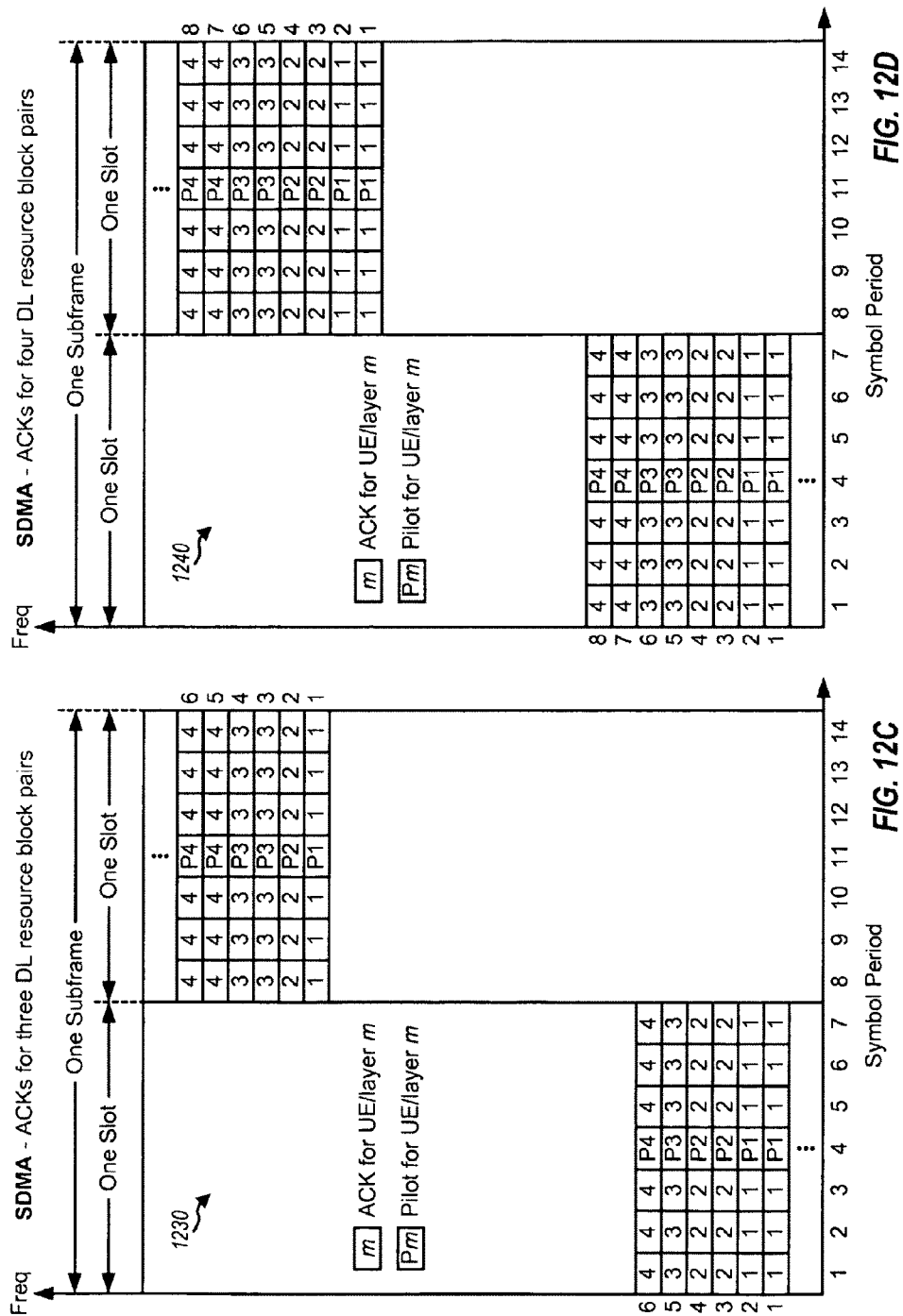

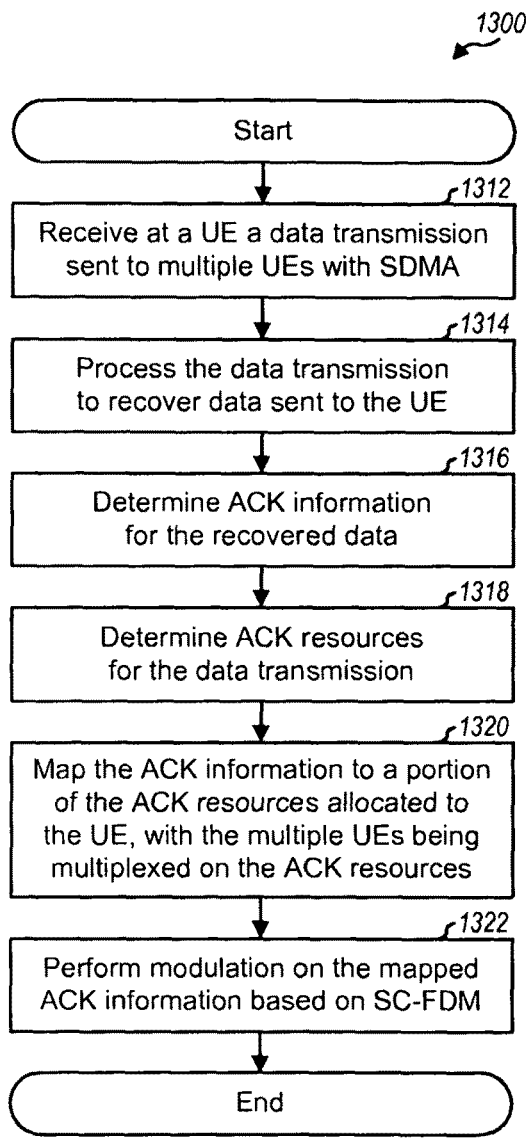

UPLINK ACK TRANSMISSION FOR SDMA IN A WIRELESS COMMUNICATION SYSTEM

The present application claims priority to provisional U.S. Application Ser. No. 60/849,588, entitled "UL CONTROL STRUCTURE FOR SDMA IN SINGLE CARRIER ORTHOGONAL SYSTEMS," filed Oct. 4, 2006, assigned to the assignee hereof and incorporated herein by reference.

BACKGROUND

I. Field

The present disclosure relates generally to communication, and more specifically to techniques for transmitting control information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include code division multiple access (CDMA) systems, time division multiple access (TDMA) systems, frequency division multiple access (FDMA) systems, orthogonal FDMA (OFDMA) systems, and single-carrier FDMA (SC-FDMA) systems.

In a wireless communication system, a base station may transmit data to one or more user equipments (UEs) on the downlink and/or receive data from the UEs on the uplink. The downlink (or forward link) refers to the communication link from the base station to the UEs, and the uplink (or reverse link) refers to the communication link from the UEs to the base station. The base station may also transmit control information (e.g., assignments of system resources) to the UEs. Similarly, the UEs may transmit control information to the base station to support data transmission on the downlink and/or for other purposes. It is desirable to transmit data and control information as efficiently as possible in order to improve system performance.

SUMMARY

Techniques for transmitting acknowledgement (ACK) information in a wireless communication system are described herein. The system may support multiple-input multiple-output (MIMO) data transmission to a single UE with single-user MIMO (SU-MIMO) or to multiple UEs on the same downlink resources with spatial division multiple access (SDMA).

A base station may send a MIMO data transmission comprising multiple (M) layers to up to M UEs. Each layer may correspond to a packet, a transport block, a data block, a data stream, etc. In one design, downlink resources used for data transmission may be associated with ACK resources used to send ACK information for the data transmission. The ACK resources may be partitioned into M portions using frequency division multiplexing (FDM), time division multiplexing (TDM), etc. Each of the M layers may be associated with a respective one of the M portions of the ACK resources. A recipient UE for each layer may send ACK information for that layer on the associated portion of the ACK resources. For each ACK resource portion, one or more pilot symbols may be sent on one or more resource elements, and ACK symbols carrying the ACK information may be sent on remaining resource elements.

In one design, a base station may send a data transmission to multiple UEs with SDMA. The base station may determine ACK resources for the data transmission and the portion of the ACK resources allocated to each UE based on the layer sent to that UE. The base station may receive uplink signals from the UEs and perform demodulation on the received signals to obtain received symbols. The base station may then process the received symbols from each portion of the ACK resources to obtain ACK information sent by the UE allocated that portion.

In one design, a UE may receive the data transmission sent to the multiple UEs with SDMA. The UE may process the data transmission to recover data sent to the UE and may determine ACK information for the recovered data. The UE may also determine ACK resources for the data transmission and map the ACK information to a portion of the ACK resources allocated to the UE. The UE may generate an uplink signal with the mapped ACK information and may send the uplink signal to the base station.

The ACK resources may be partitioned based on various ACK structures, as described below. Various aspects and features of the disclosure are also described in further detail below.

BRIEF DESCRIPTION OF THE DRAWINGS

FIGS. 4A and 4B show two slot structures.

FIGS. 7A through 12D show various ACK structures for SU-MIMO and SDMA for different amounts of downlink resources and different slot structures.

FIG. 13 shows a process for sending ACK information by the UE.

FIG. 14 shows an apparatus for sending ACK information.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for LTE, and LTE terminology is used in much of the description below.

Figure 1:
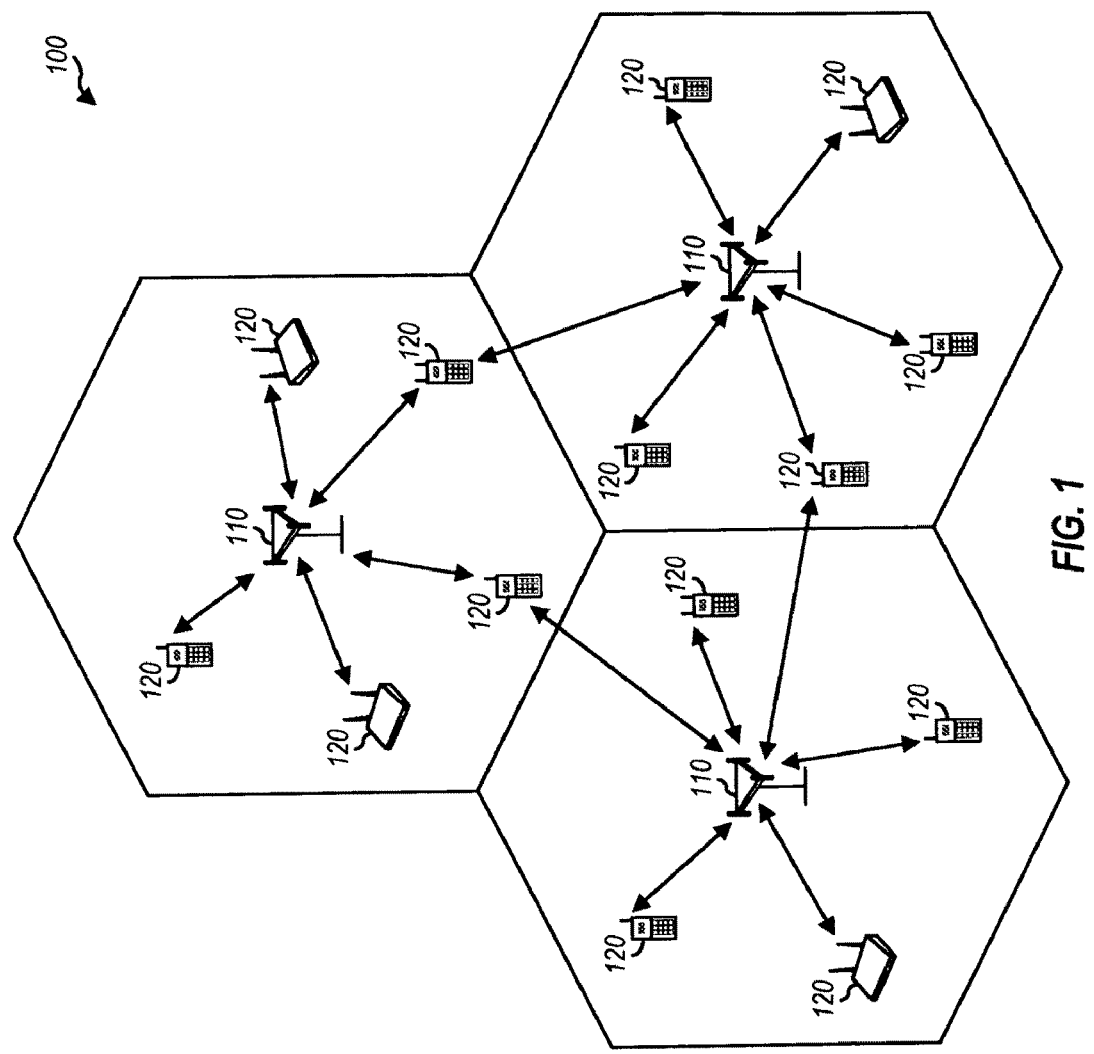
FIG. 1 shows a wireless multiple-access communication system.

FIG. 1 shows a wireless multiple-access communication system 100 with multiple evolved Node Bs (eNBs) 110. An eNB may be a fixed station used for communicating with the UEs and may also be referred to as a Node B, a base station, an access point, etc. Each eNB 110 provides communication coverage for a particular geographic area. UEs 120 may be dispersed throughout the system. A UE may be stationary or mobile and may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with one or more eNBs via transmissions on the downlink and uplink.

The system may support hybrid automatic retransmission (HARQ). For HARQ on the downlink, an eNB may send a transmission for a packet and may send one or more retransmissions until the packet is decoded correctly by a recipient UE, or the maximum number of retransmissions has been sent, or some other termination condition is encountered. HARQ may improve reliability of data transmission.

Figure 2:
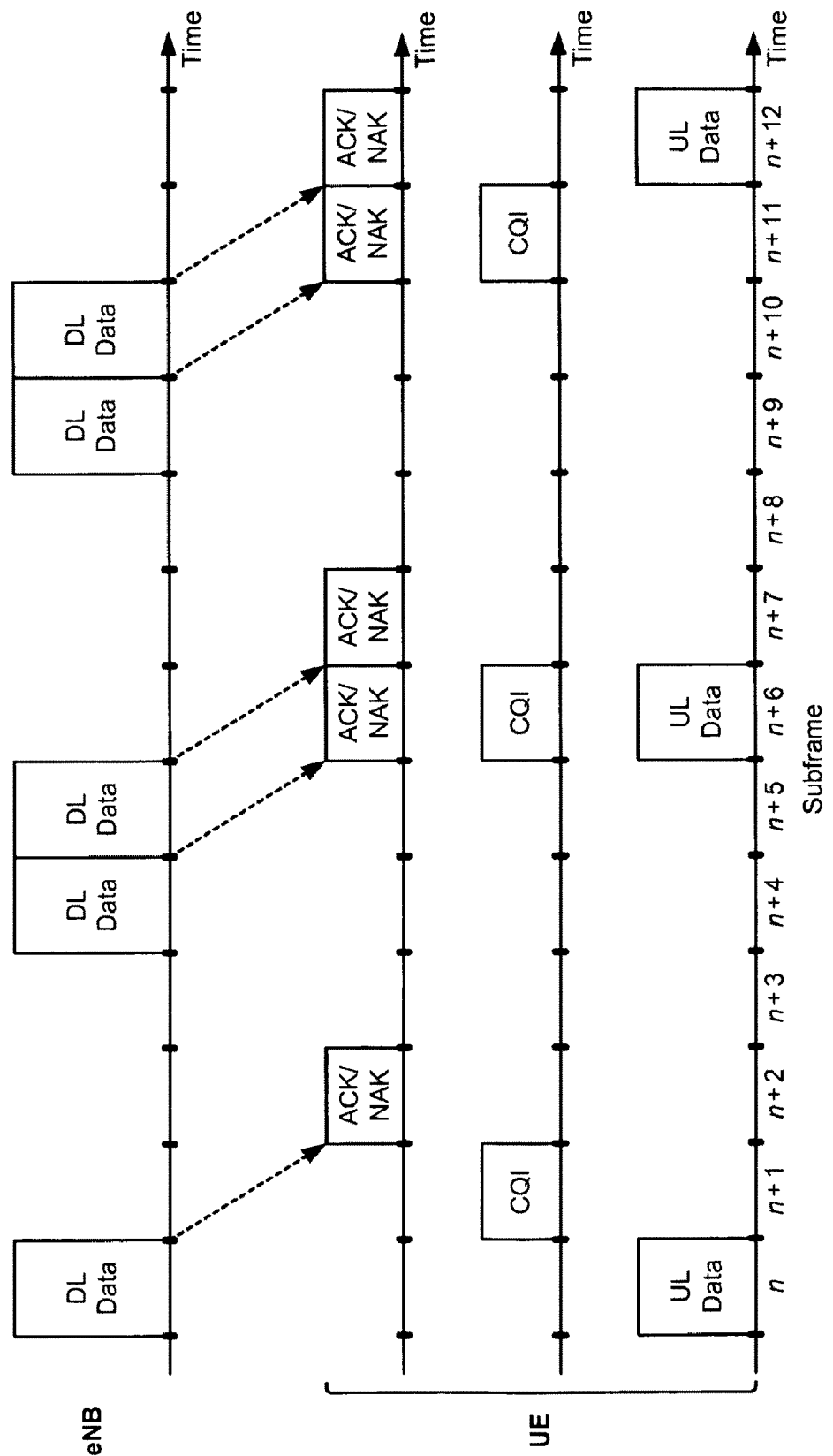
FIG. 2 shows downlink and uplink transmissions between an eNB and a UE.

FIG. 2 shows downlink (DL) transmission by an eNB and uplink (UL) transmission by a UE. The UE may periodically estimate the downlink channel quality for the eNB and may send channel quality indicator (CQI) to the eNB. The eNB may use the CQI and/or other information to select the UE for downlink transmission and to select a suitable rate (e.g., a modulation and coding scheme) for transmission to the UE. The eNB may process and transmit data to the UE when there is data to send and system resources are available. The UE may process a downlink data transmission from the eNB and may send an acknowledgement (ACK) if the data is decoded correctly or a negative acknowledgement (NAK) if the data is decoded in error. The eNB may retransmit the data if a NAK is received and may transmit new data if an ACK is received. The UE may also transmit data on the uplink to the eNB when there is data to send and the UE is assigned uplink resources.

In the following description, the terms "ACK" and "ACK information" generically refer to ACK and/or NAK. As shown in FIG. 2, the UE may transmit data and/or control information, or neither, in any given subframe. The control information may comprise ACK, CQI, etc. The type and amount of control information to send may be dependent on various factors such as whether MIMO is used for transmission, the number of layers being sent, etc. For simplicity, only ACK and CQI are described below.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. In LTE, the spacing between adjacent subcarriers is fixed, and the total number of subcarriers (N) is dependent on the system bandwidth. N may be equal to 128, 256, 512, 1024 or 2048 for system bandwidth of 1.25, 2.5, 5, 10 or 20 MHz, respectively. In general, N may be any integer value.

Figure 3:
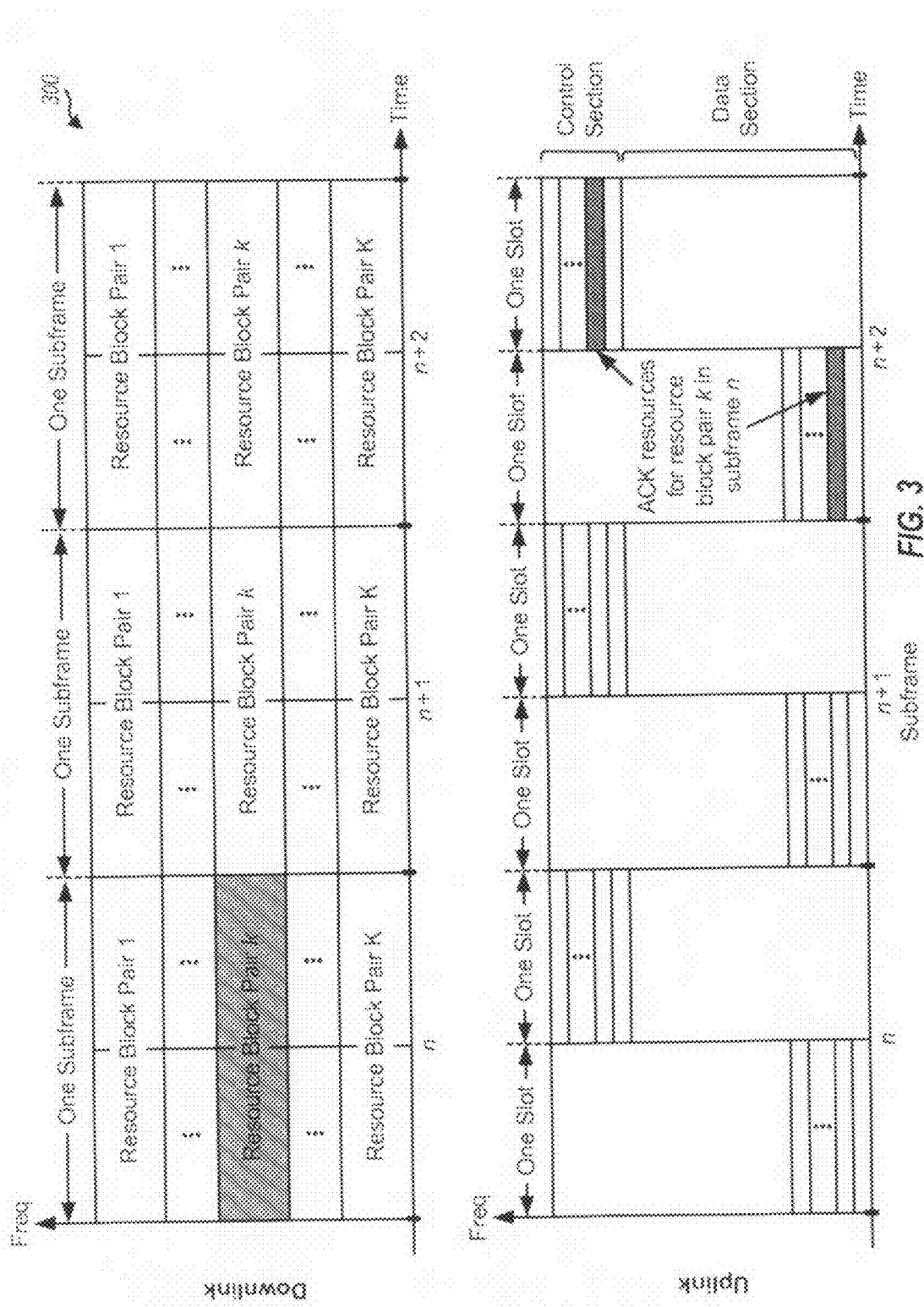
FIG. 3 shows a transmission structure for the downlink and uplink.

FIG. 3 shows a design of a transmission structure 300 that may be used for the downlink and uplink. The transmission timeline may be partitioned into subframes. A subframe may have a fixed duration, e.g., one millisecond (ms), and may be partitioned into two slots. Each slot may cover a fixed or variable number of symbol periods.

For the downlink, K resource blocks may be defined in each slot. Each resource block may cover V subcarriers (e.g., V=12 subcarriers) in one slot. The available resource blocks may be assigned to UEs for downlink transmission. In one design, a UE may be assigned one or more pairs of resource blocks in a given subframe. Each resource block pair covers V subcarriers in two slots of one subframe.

For the uplink, the N total subcarriers may be divided into a data section and a control section. The control section may be formed at an edge of the system bandwidth, as shown in FIG. 3. The control section may have a configurable size, which may be selected based on the amount of control information being sent on the uplink by the UEs. The data section may include all subcarriers not included in the control section. The design in FIG. 3 results in the data section including contiguous subcarriers, which would then allow a single UE to be assigned all of the contiguous subcarriers in the data section.

FIG. 3 shows a design in which a control section is formed at one edge of the system bandwidth in each slot. In another design, a control section may be formed at both the upper and lower edges of the system bandwidth in each slot. The upper edge portion of the control section may be assigned for one or more UEs, and the lower edge portion of the control section may be assigned to one or more other UEs.

In one design, each resource block pair on the downlink is associated with corresponding ACK resources in the control section on the uplink, as shown in FIG. 3. For data sent on resource block pair k in subframe n, ACK for the data may be sent on the associated ACK resources for this resource block pair. In general, any amount of ACK resources may be associated with a given downlink resource block pair. In one design, the ACK resources for one downlink resource block pair include two consecutive subcarriers in each slot of a subframe.

FIG. 4A shows a design of a slot structure 410 that may be used for the downlink and/or uplink. In this design, a slot includes six long symbol periods 1, 3, 4, 5, 6 and 8 and two short symbol periods 2 and 7. A short symbol period may be half the duration of a long symbol period. Data and/or control information may be sent in each long symbol period, and pilot may be sent in each short symbol period. A modulation symbol may be sent on one resource element, which may be either one narrow (e.g., 15 KHz) subcarrier in one long symbol period or one wide (e.g., 30 KHz) subcarrier (which covers two narrow subcarriers) in one short symbol period. In general, a resource element may be one subcarrier in one symbol period and may also be referred to as a resource unit, etc.

FIG. 4B shows a design of a slot structure 420 that may also be used for the downlink and/or uplink. In this design, a slot includes seven symbol periods of equal duration. Pilot may be sent in symbol period 4, and data and/or control information may be sent in each remaining symbol period. A modulation symbol may be sent on one resource element, which may be one subcarrier in one symbol period.

FIGS. 4A and 4B show two example slot structures. Other slot structures may also be used to send data, control information, and pilot. Furthermore, data, control information, and pilot may be multiplexed in other manners, e.g., on different resource elements than those shown in FIGS. 4A and 4B.

A UE may be assigned CQI resources for sending CQI on the uplink. The UE may also be assigned uplink resources for sending data on the uplink. The UE may also receive a downlink data transmission on one or more resource block pairs, which may be associated with ACK resources for sending ACK on the uplink. The uplink resources may be located in the data segment, the CQI resources may be at a fixed location in the control segment, and the ACK resources may be at a variable location in the control segment and determined by the downlink resource assignment.

It may be desirable for the UE to transmit on contiguous subcarriers using SC-FDM, which is also referred to as localized frequency division multiplexing (LFDM). Transmitting on contiguous subcarriers may result in a lower peak-to-average ratio (PAR). PAR is the ratio of the peak power of a waveform to the average power of the waveform. A low PAR is desirable since it may allow a power amplifier (PA) to be operated at an average output power that is closer to the peak output power. This, in turn, may improve throughput and/or link margin for the UE.

In general, the UE may send any one or any combination of ACK, CQI and data on the uplink in a given subframe. The UE may be assigned ACK resources and/or CQI resources located near an edge of the system bandwidth. The HE may also be assigned uplink resources within the data section. The subcarriers for the ACK and/or CQI resources may not be adjacent to the subcarriers for the uplink resources. The UE may send ACK, CQI and/or data as shown in Table 1 in order to ensure that the UE transmits on contiguous subcarriers regardless of whether ACK, CQI and/or data are being sent. This may then allow the UE to achieve lower PAR.

TABLE 1

| UL Transmission | Description |
| --- | --- |
| Only ACK | Send ACK on ACK resources associated with downlink resources used for data transmission. |
| Only CQI | Send CQI on CQI resources assigned to the UE. |
| ACK & CQI | Multiplex ACK and CQI and send on either the ACK or CQI resources. |
| ACK, CQI & Data | Multiplex ACK and CQI with data and send on uplink resources assigned to the UE. |

Figure 5A:
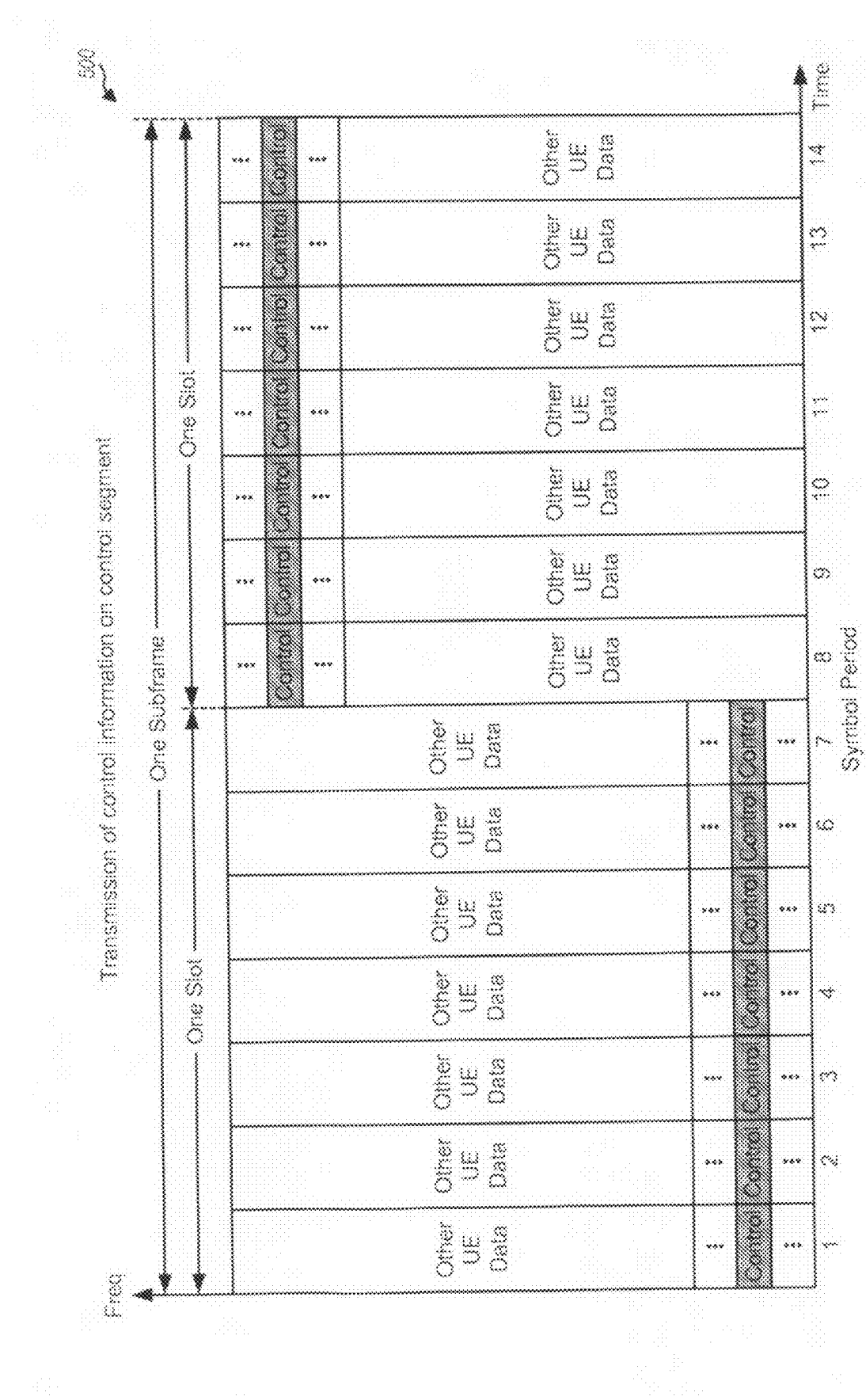
FIG. 5A shows transmission of only control information by the UE.

FIG. 5A shows transmission of only control information (e.g., ACK and/or CQI) in a subframe when there is no data to send on the uplink. The UE may be assigned ACK and/or CQI resources that may be mapped to different sets of subcarriers in the two slots of the subframe. The UE may send control information on the subcarriers in the assigned ACK or CQI resources in each symbol period. The remaining subcarriers may be used by other UEs for uplink transmission.

Figure 5B:
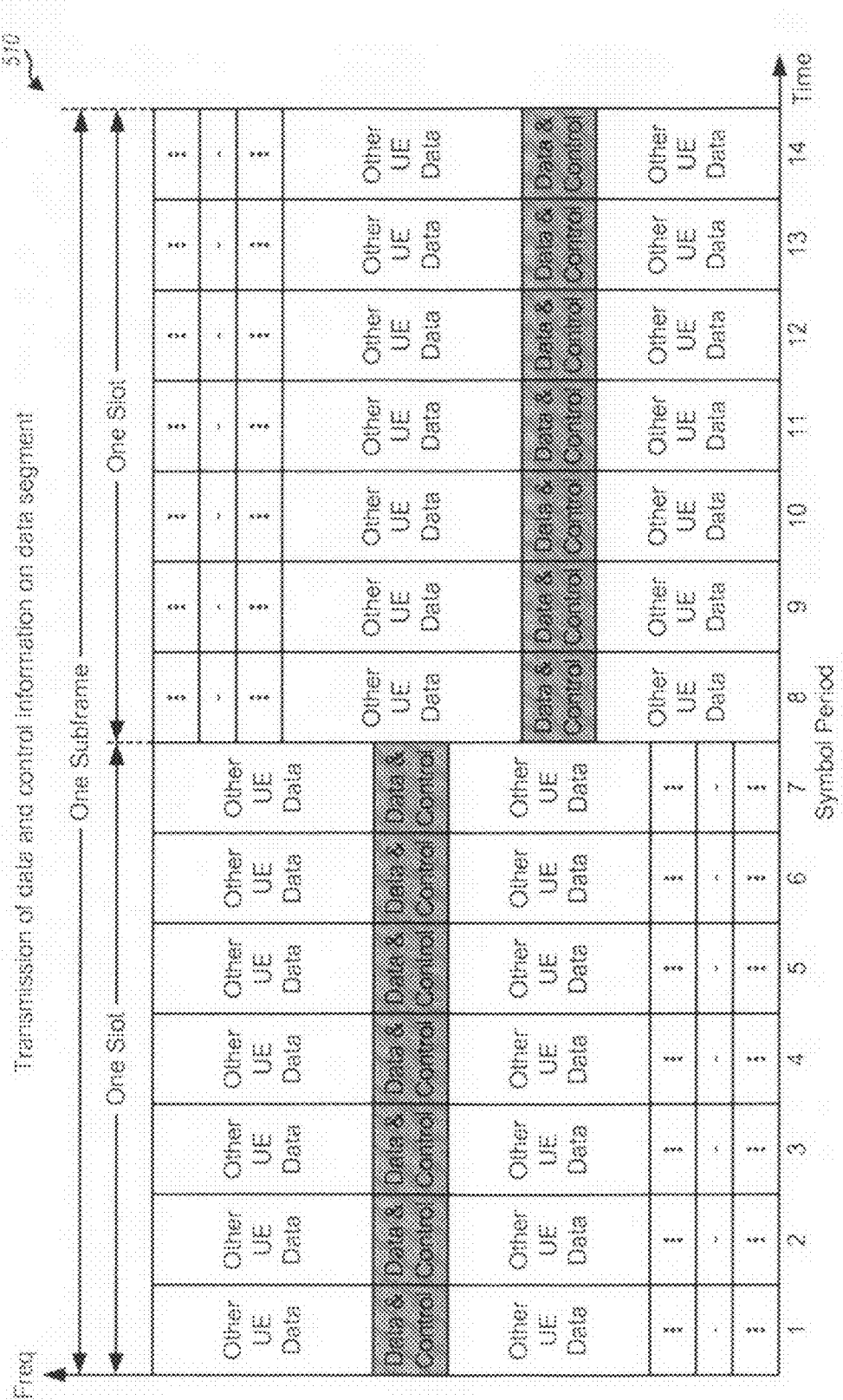
FIG. 5B shows transmission of data and control information by the UE.

FIG. 5B shows transmission of data and control information when there is data to send on the uplink. The UE may be assigned uplink resources that may be mapped to different sets of subcarriers in the two slots of a subframe. The UE may send data and control information on the subcarriers in the assigned uplink resources in each symbol period. The remaining subcarriers may be used by other UEs for uplink transmission.

FIGS. 5A and 5B show frequency hopping from slot to slot to achieve frequency diversity against deleterious path effects and randomization of interference, which may improve performance. Frequency hopping may also be performed over other time intervals, e.g., from symbol period to symbol period, from subframe to subframe, etc.

The system may support single-input single-output (SISO), single-input multiple-output (SIMO), multiple-input single-output (MISO), and/or MIMO transmission. Single-input refers to one transmit antenna and multiple-input refers to multiple transmit antennas for data transmission. Single-output refers to one receive antenna and multiple-output refers to multiple receive antennas for data reception.

Figure 6A:
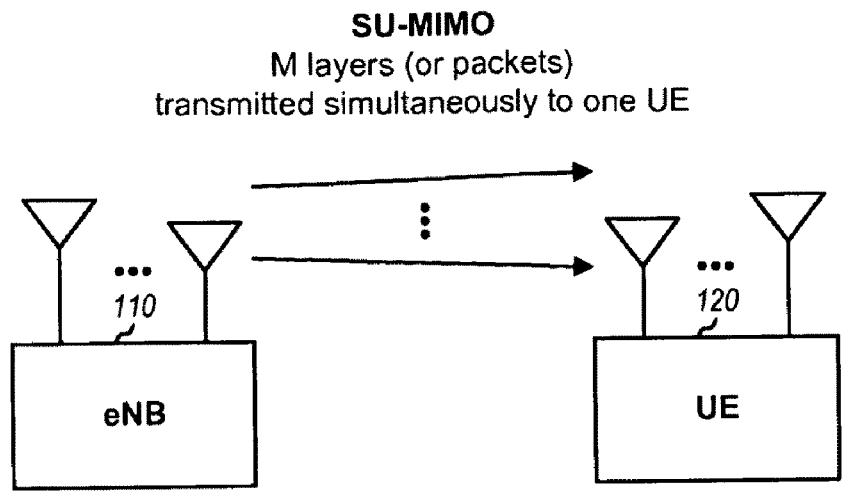
FIG. 6A shows downlink transmission for SU-MIMO.

FIG. 6A shows data transmission for SU-MIMO. For SU-MIMO, an eNB 110 sends a MIMO data transmission comprising multiple (M) layers to a single UE 120 on a set of resource blocks. The UE may receive the MIMO data transmission with M or more antennas and may be able to recover each layer.

Figure 6B:
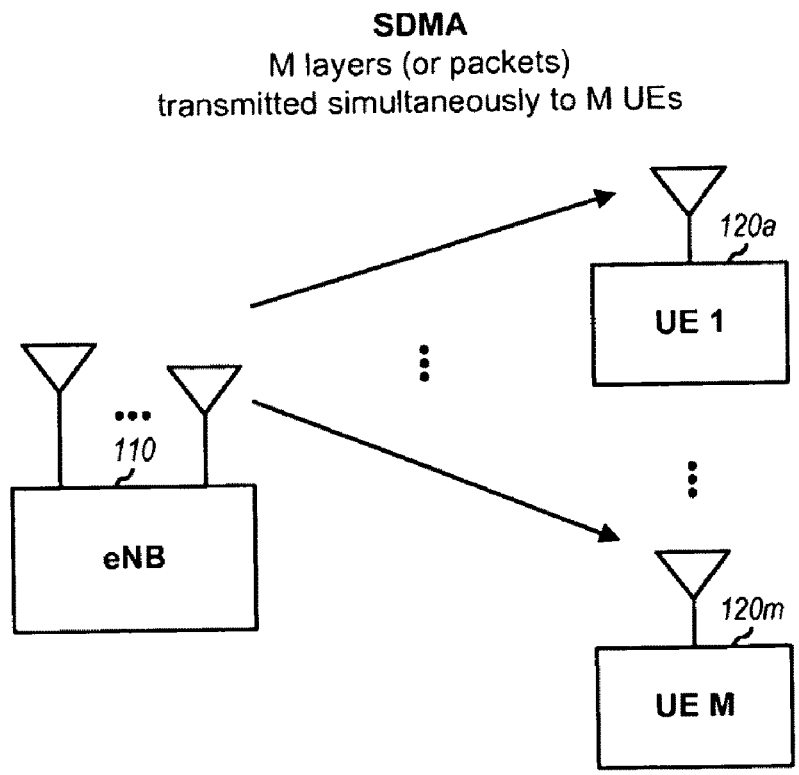
FIG. 6B shows downlink transmission for SDMA.

FIG. 6B shows data transmission for SDMA, which is also referred to as multi-user MIMO (MU-MIMO). For SDMA, an eNB 110 sends a MIMO data transmission comprising M layers to M UEs 120*a* through 120*m* on the same set of resource blocks. The eNB may perform precoding or beamforming to steer each layer to the recipient UE. In this case, each UE may be able to receive its layer with a single antenna, as shown in FIG. 6B. The eNB may also transmit the M layers from M antennas, one layer from each antenna. In this case, each UE may receive the MIMO data transmission with multiple antennas and may perform MIMO detection to recover its layer in the presence of interference from the other layers (not shown in FIG. 6B). In general, the eNB may send one or more layers to each UE for SDMA, and each UE may recover its layer(s) with a sufficient number of antennas.

An eNB may transmit data to one or more UEs on one or more resource blocks. A decision on whether to transmit using SISO, MISO, SDMA, or SU-MIMO may be dependent on various factors such as the UE capability, channel conditions, etc. The eNB may use SDMA for some resource blocks, SU-MIMO for some other resource blocks, SISO or MISO for yet some other resource blocks, etc. For SU-MIMO, the eNB may send a MIMO data transmission comprising M layers to a single UE, and each layer may be independently acknowledged. The ACKs for the M layers may be jointly encoded and sent on either the associated ACK resources or the uplink resources assigned to the UE. For SDMA, the eNB may send a MIMO data transmission comprising M layers on L resource blocks to M different UEs, where L and M may each be any integer value. The M UEs may send their ACKs on the same ACK resources associated with the L resource blocks used for the MIMO data transmission, which may then lead to loss in orthogonality.

In an aspect, for SDMA, each UE may transmit its ACK on a different portion of the ACK resources in order to preserve orthogonality on the uplink between the M UEs. In one design, the ACK location for each UE may be implicitly determined based on the layer sent to that UE. The ACK resources may be partitioned into M portions 1 through M that may be associated with layers 1 through M, respectively. The UE receiving layer 1 may send its ACK on ACK resource portion 1, the UE receiving layer 2 may send its ACK on ACK resource portion 2, etc.

In one design, the M UEs are frequency division multiplexed (FDM) on the ACK resources. With FDM, each UE may be allocated a subset of the subcarriers in the ACK resources. The number of subcarriers allocated to each UE may be dependent on the total number of subcarriers in the ACK resources, the total number of layers being sent to the M UEs, and the number of layers being sent to that UE. Each UE may be allocated one or more subcarriers in the two slots of a subframe, if possible, in order to achieve frequency diversity. Each UE may also send its ACK in a manner such that an SC-FDM waveform can be preserved for that UE while maintaining orthogonality with the other UEs.

For simplicity, the following description assumes that data and CQI are not being transmitted and that a MIMO data transmission is sent to M=4 UEs with indices of 1, 2, 3 and 4. Much of the following description assumes the use of the slot structure shown in FIG. 4A.

FIG. 7A shows a design of an ACK structure 710 for a single UE assigned one resource block pair on the downlink. In this design, the ACK resources comprise two subcarriers 1 and 2 in each slot of a subframe. The UE may receive a MIMO data transmission comprising M layers and may use all of the ACK resources to send ACKs for these M layers. The UE may jointly encode the ACKs and then map the encoded ACKs to resource elements not used for pilot. The UE may send pilot symbols on the resource elements used for pilot.

FIG. 7B shows a design of an ACK structure 720 for four UEs spatially multiplexed onto one downlink resource block pair with SDMA. In this design, each UE transmits its ACK in either the first or second slot of a subframe. The transmission time interval (TTI) for the ACK from each UE is effectively reduced from one subframe to one slot. In the design shown in FIG. 7B, UE 1 is allocated subcarrier 1 in the first slot as well as the pilot subcarrier in the first short symbol period of this slot. UE 2 is allocated subcarrier 2 in the first slot as well as the pilot subcarrier in the second short symbol period of this slot. UE 3 is allocated subcarrier 1 in the second slot as well as the pilot subcarrier in the first short symbol period of this slot. UE 4 is allocated subcarrier 2 in the second slot as well as the pilot subcarrier in the second short symbol period of this slot. Each UE may map its ACK to the resource elements in the subcarrier and slot allocated to that UE.

FIG. 8A shows a design of an ACK structure 810 for a single UE assigned two resource block pairs on the downlink. In this design, the ACK resources comprise four subcarriers 1 through 4 in each slot of a subframe. The UE may receive a MIMO data transmission comprising M layers and may use all of the ACK resources to send ACKs for these M layers.

FIG. 8B shows a design of an ACK structure 820 for four UEs spatially multiplexed onto two downlink resource block pairs with SDMA. In this design, each UE is allocated subcarriers in the same location in the first and second slots of a subframe and transmits its ACK in both slots of the subframe. In each slot, UE 1 is allocated subcarrier 1 as well as the lower pilot subcarrier in the first short symbol period. UE 2 is allocated subcarrier 2 as well as the lower pilot subcarrier in the second short symbol period. UE 3 is allocated subcarrier 3 as well as the higher pilot subcarrier in the first short symbol period. UE 4 is allocated subcarrier 4 as well as the higher pilot subcarrier in the second short symbol period.

FIG. 8C shows a design of an ACK structure 830 for four UEs spatially multiplexed onto two downlink resource block pairs with SDMA. In this design, each UE transmits its ACK in either the first or second slot of a subframe. UE 1 is allocated subcarriers 1 and 2 in the first slot as well as the lower pilot subcarrier in both short symbol periods of this slot. UE 2 is allocated subcarriers 3 and 4 in the first slot as well as the higher pilot subcarrier in both short symbol periods of this slot. UE 3 is allocated subcarriers 1 and 2 in the second slot as well as the lower pilot subcarrier in both short symbol periods of this slot. UE 4 is allocated subcarriers 3 and 4 in the second slot as well as the higher pilot subcarrier in both short symbol periods of this slot.

In ACK structures 820 and 830, all four UEs are allocated the same ACK bandwidth in the subframe. The ACK bandwidth allocation for each UE is symmetric across both slots in ACK structure 820. For both ACK structures 820 and 830, each UE may map its ACK to the resource elements in the subcarriers allocated to that UE in either one or two slots.

FIG. 9A shows a design of an ACK structure 910 for a single UE assigned three resource block pairs on the downlink. In this design, the ACK resources comprise six subcarriers 1 through 6 in each slot of a subframe. The UE may receive a MIMO data transmission comprising M layers and may use all of the ACK resources to send ACKs for these M layers.

FIG. 9B shows a design of an ACK structure 920 for four UEs spatially multiplexed onto three downlink resource block pairs with SDMA. In this design, each UE is allocated subcarriers in different locations in the first and second slots of a subframe and transmits its ACK in both slots of the subframe. In the first slot, UE 1 is allocated subcarriers 1 and 2 as well as the lowest pilot subcarrier in both short symbol periods. UE 2 is allocated subcarriers 3 and 4 as well as the middle pilot subcarrier in both short symbol periods. UE 3 is allocated subcarrier 5 as well as the highest pilot subcarrier in the first short symbol period. UE 4 is allocated subcarrier 6 as well as the highest pilot subcarrier in the second short symbol period. In the second slot, UE 1 is allocated subcarrier 1 as well as the lowest pilot subcarrier in the first short symbol period. UE 2 is allocated subcarrier 2 as well as the lowest pilot subcarrier in the second short symbol period. UE 3 is allocated subcarriers 3 and 4 as well as the middle pilot subcarrier in both short symbol periods. UE 4 is allocated subcarriers 5 and 6 as well as the highest pilot subcarrier in both short symbol periods.

In the design shown in FIG. 9B, each UE is allocated a total of three subcarriers—one subcarrier in one slot and two subcarriers in the other slot. The four UEs are allocated the same ACK bandwidth (or the same total number of subcarriers) in the two slots. However, the ACK bandwidth allocation for each UE is not symmetric across the two slots. Each UE may map its ACK to the resource elements in the subcarriers allocated to that UE in the two slots.

FIG. 10A shows a design of an ACK structure 1010 for a single UE assigned four resource block pairs on the downlink. In this design, the ACK resources comprise eight subcarriers 1 through 8 in each slot of a subframe. The UE may receive a MIMO data transmission comprising M layers and may use all of the ACK resources to send ACKs for these M layers.

FIG. 10B shows a design of an ACK structure 1020 for four UEs spatially multiplexed onto four downlink resource block pairs with SDMA. In this design, each UE is allocated subcarriers in the same location in the first and second slots of a subframe and transmits its ACK in both slots of the subframe. In each slot, UE 1 is allocated subcarriers 1 and 2 as well as the lowest pilot subcarrier in both short symbol periods. UE 2 is allocated subcarriers 3 and 4 as well as the second lowest pilot subcarrier in both short symbol periods. UE 3 is allocated subcarriers 5 and 6 as well as the second highest pilot subcarrier in both short symbol periods. UE 4 is allocated subcarriers 7 and 8 as well as the highest pilot subcarrier in both short symbol periods. The four UEs are allocated the same ACK bandwidth in the subframe, and the ACK bandwidth allocation for each UE is symmetric across both slots. Each UE may map its ACK to the resource elements in the subcarriers allocated to that UE in the two slots.

Figures 11A, 11B:
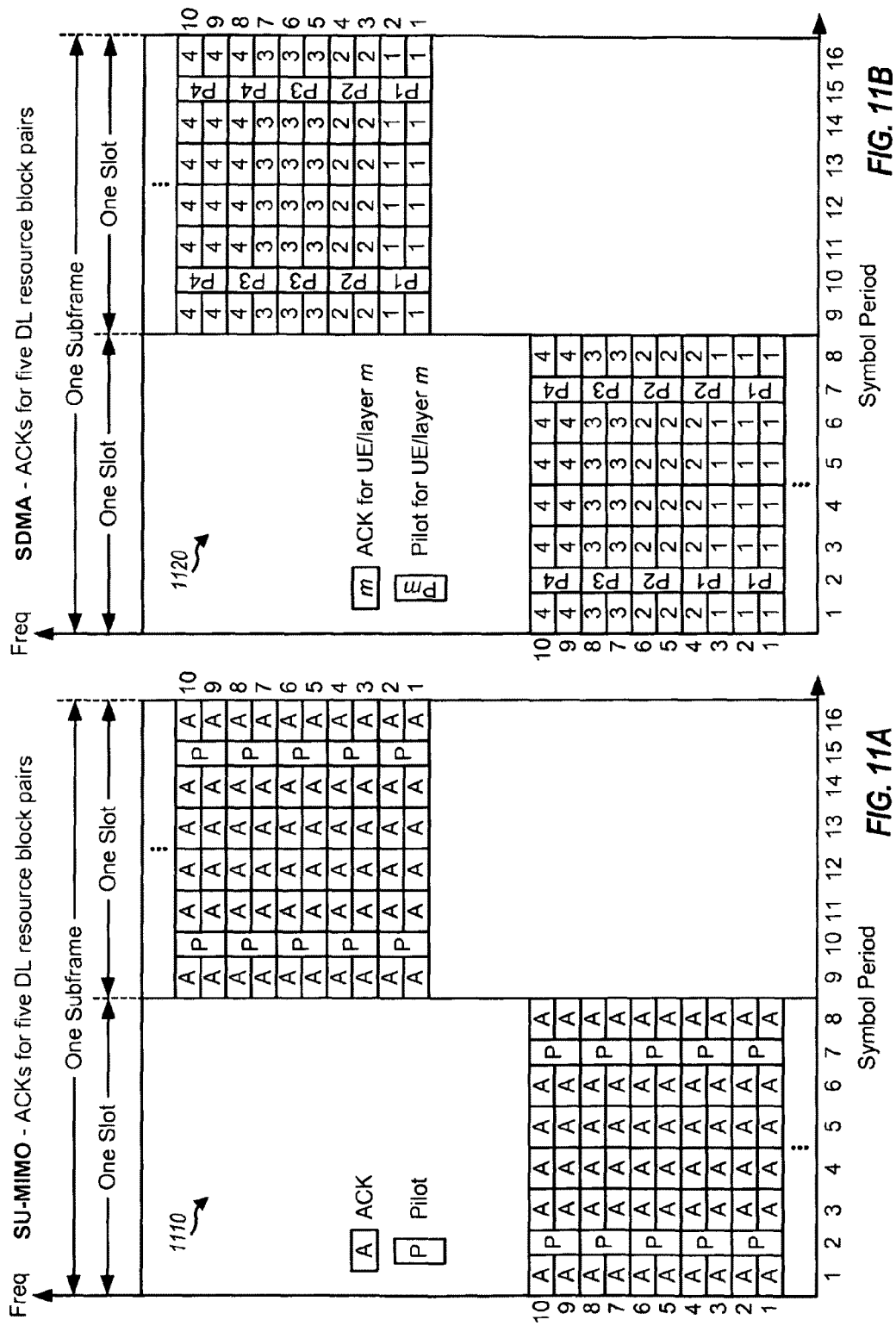

FIG. 11A shows a design of an ACK structure 1110 for a single UE assigned five resource block pairs on the downlink. In this design, the ACK resources comprise ten subcarriers 1 through 10 in each slot of a subframe. The UE may receive a MIMO data transmission comprising M layers and may use all of the ACK resources to send ACKs for these M layers.

FIG. 11B shows a design of an ACK structure 1120 for four UEs spatially multiplexed onto five downlink resource block pairs with SDMA. In this design, each UE is allocated subcarriers in different locations in the first and second slots of a subframe and transmits its ACK in both slots of the subframe. In the first slot, UE 1 is allocated subcarriers 1, 2 and 3 as well as the two lowest pilot subcarriers in the first short symbol period and the lowest pilot subcarrier in the second short symbol period. UE 2 is allocated subcarriers 4, 5 and 6 as well as the middle pilot subcarrier in the first short symbol period and the second and third lowest pilot subcarriers in the second short symbol period. UE 3 is allocated subcarriers 7 and 8 as well as the second highest pilot subcarrier in both short symbol periods. UE 4 is allocated subcarriers 9 and 10 as well as the highest pilot subcarrier in both short symbol periods. In the second slot, UE 1 is allocated subcarriers 1 and 2 as well as the lowest pilot subcarrier in both short symbol periods. UE 2 is allocated subcarriers 3 and 4 as well as the second lowest pilot subcarrier in both short symbol periods. UE 3 is allocated subcarriers 5, 6 and 7 as well as the second and third highest pilot subcarriers in the first short symbol period and the middle pilot subcarrier in the second short symbol period. UE 4 is allocated subcarriers 8, 9 and 10 as well as the highest pilot subcarrier in the first short symbol period and the two highest pilot subcarriers in the second short symbol period.

In the design shown in FIG. 11B, each UE is allocated a total of five subcarriers—two subcarriers in one slot and three subcarriers in the other slot. The four UEs are allocated the same ACK bandwidth (or the same total number of subcarriers) in the two slots. However, the ACK bandwidth allocation for each UE is not symmetric across the two slots. Each UE may map its ACK to the resource elements in the subcarriers allocated to that UE in the two slots.

In general, a MIMO data transmission may be sent on L resource block pairs, and the associated ACK resources may include 2L subcarriers in each slot, where $L \geq 1$. The ACK resources may be allocated to four UEs as shown in Table 2. In Table 2, a subcarrier used to send ACK is referred to as a data tone, a subcarrier used to send pilot is referred to as a pilot tone, and a short symbol period is referred to as a short block (SB).

TABLE 2

| Slot | Subcarriers/tones | UE 1 | UE 2 | UE 3 | UE 4 |
|---|---|---|---|---|---|
| 1 | # Data tones | $\lceil L/2 \rceil$ | $\lceil L/2 \rceil$ | $\lfloor L/2 \rfloor$ | $\lfloor L/2 \rfloor$ |
|   | # Pilot tones in $1^{st}$ SB | $L_1$ | $L_2$ | $L_3$ | $L_4$ |
|   | # Pilot tones in $2^{nd}$ SB | $L_2$ | $L_1$ | $L_4$ | $L_3$ |
| 2 | # Data tones | $\lfloor L/2 \rfloor$ | $\lfloor L/2 \rfloor$ | $\lceil L/2 \rceil$ | $\lceil L/2 \rceil$ |
|   | # Pilot tones in $1^{st}$ SB | $L_3$ | $L_4$ | $L_1$ | $L_2$ |
|   | # Pilot tones in $2^{nd}$ SB | $L_4$ | $L_3$ | $L_2$ | $L_1$ |

In Table 2, $\lfloor x \rfloor$ denotes a floor operator that provides the largest integer value equal to or less than x, and $\lceil x \rceil$ denotes a ceiling operator that provides the smallest integer value equal to or greater than x. $L_1$ through $L_4$ are the numbers of pilot tones in the four short symbol periods of a subframe for a given UE and may be determined as follows:

$$L_1 = \lfloor (L+3)/4 \rfloor, L_2 = \lfloor (L+1)/4 \rfloor, L_3 = \lfloor (L+2)/4 \rfloor, \text{ and } L_4 = \lfloor L/4 \rfloor, \quad \text{Eq (1)}$$

where $L_1 + L_2 + L_3 + L_4 = L$.

In Table 2, columns 3, 4, 5 and 6 give the tone allocation for UEs 1, 2, 3 and 4, respectively. As indicated in column 3, UE 1 is allocated $\lceil L/2 \rceil$ data tones in the first slot and $\lceil L/2 \rceil$ data tones in the second slot, $L_1$ pilot tones in the first short symbol period and $L_2$ pilot tones in the second short symbol period of the first slot, and $L_3$ pilot tones in the first short symbol period and $L_4$ pilot tones in the second short symbol period of the second slot. The tone allocation for each remaining UE is shown in the respective column.

In the design shown in Table 2, each UE is allocated a total of L data tones in the two slots of a subframe regardless of the value of L. These L data tones may be distributed across the two slots in different manners for different values of L and also for different UEs. For an odd value of L, each UE is allocated $\lfloor L/2 \rfloor$ data tones in one slot and $\lceil L/2 \rceil = \lfloor L/2 \rfloor + 1$ data tones in the other slot. For an even value of L, $\lfloor L/2 \rfloor = \lceil L/2 \rceil = L/2$, and each UE is allocated L/2 data tones in each slot.

In the design shown in Table 2, each UE is allocated a total of L pilot tones in the four short symbol periods of a subframe regardless of the value of L. These L pilot tones may be distributed across the four short symbol periods in different manners for different values of L and also for different UEs. Each UE is allocated either $\lfloor L/4 \rfloor$ or $\lceil L/4 \rceil$ pilot tones in each short symbol period of each slot depending on the value of L. $L_1$ through $L_4$ are equal to zero for L=0. For each increment of 1 in L, one of $L_1$ through $L_4$ is incremented by 1. $L_1, L_3, L_2$ and $L_4$ are incremented one at a time and in a circular manner starting with $L_1$, as follows:

$L_1, L_2, L_3, L_4 = 1, 0, 0, 0$ for L=1, $L_1, L_2, L_3, L_4 = 1, 0, 1, 0$ for L=2, $L_1, L_2, L_3, L_4 = 1, 1, 1, 0$ for L=3, $L_1, L_2, L_3, L_4 = 1, 1, 1, 1$ for L=4, $L_1, L_2, L_3, L_4 = 2, 1, 1, 1$ for L=5, $L_1, L_2, L_3, L_4 = 2, 1, 2, 1$ for L=6, etc.

As shown in Table 2, each UE is allocated $L_1, L_2, L_3$ and $L_4$ pilot tones in the four short symbol periods of a subframe. Furthermore, $L_1 + L_2 + L_3 + L_4 = L$ total pilot tones are allocated to the four UEs in each short symbol period.

Table 2 shows a design in which four UEs are allocated ACK resources comprising a total of 2L data tones in each slot and a total of 4L pilot tones in four short symbol periods of two slots. In general, the ACK resources may be allocated to M UEs, where $M \geq 1$. Each UE may be allocated $\lfloor 2L/M \rfloor$ data tones in one slot and $\lceil 2L/M \rceil$ data tones in the other slot. Each UE may also be allocated $L_1, L_2, L_3$ and $L_4$ pilot tones in the four short symbol periods, which may be given as:

$$L_1 = L(L+(3 \bmod M))/M \rfloor, L_2 = \lfloor (L+(1 \bmod M))/M \rfloor,$$
$$L_3 = \lfloor (L+(2 \bmod M))/M \rfloor, L_4 = \lfloor L/M \rfloor, \quad \text{Eq (2)}$$

where $L_1 + L_2 + L_3 + L_4 = \lfloor 4L/M \rfloor$.

FIGS. 7A through 11B show frequency division multiplexing of four UEs on ACK resources based on the slot structure shown in FIG. 4A. Multiple UEs may also be multiplexed on ACK resources based on other slot structures.

FIG. 12A shows a design of an ACK structure 1210 for four UEs spatially multiplexed onto one downlink resource block pair with the slot structure shown in FIG. 4B. In this design, UE 1 is allocated subcarrier 1 in the first slot, UE 2 is allocated subcarrier 2 in the first slot, UE 3 is allocated subcarrier 1 in the second slot, and UE 4 is allocated subcarrier 2 in the second slot. Each UE may map its ACK to six resource elements and map a pilot symbol to one resource element in the subcarrier and slot allocated to that UE.

FIG. 12B shows a design of an ACK structure 1220 for four UEs spatially multiplexed onto two downlink resource block pairs with the slot structure shown in FIG. 4B. In each slot, UE 1 is allocated subcarrier 1, UE 2 is allocated subcarrier 2, UE 3 is allocated subcarrier 3, and UE 4 is allocated subcarrier 4.

FIG. 12C shows a design of an ACK structure 1230 for four UEs spatially multiplexed onto three downlink resource block pairs with the slot structure shown in FIG. 4B. In the first slot, UE 1 is allocated subcarriers 1 and 2, UE 2 is allocated subcarriers 3 and 4, UE 3 is allocated subcarrier 5, and UE 4 is allocated subcarrier 6. In the second slot, UE 1 is allocated subcarrier 1, UE 2 is allocated subcarrier 2, UE 3 is allocated subcarriers 3 and 4, and UE 4 is allocated subcarriers 5 and 6. Each UE is allocated one subcarrier in one slot and two subcarriers in the other slot.

FIG. 12D shows a design of an ACK structure 1240 for four UEs spatially multiplexed onto four downlink resource block pairs with the slot structure shown in FIG. 4B. In each slot, UE 1 is allocated subcarriers 1 and 2, UE 2 is allocated subcarriers 3 and 4, UE 3 is allocated subcarriers 5 and 6, and UE 4 is allocated subcarriers 7 and 8.

Multiple UEs may also be multiplexed on the ACK resources in other manners with other multiplexing schemes such as TDM, code division multiplexing (CDM), etc. In another design, multiple UEs may be multiplexed on the ACK resources using TDM, and each UE may be allocated a subset of the symbol periods for the ACK resources. Multiple UEs may also be multiplexed using a combination of multiplexing schemes, e.g., FDM and TDM, TDM and CDM, etc. Multiple UEs may be multiplexed based on other ACK structures and other slot structures, which may be dependent on the multiplexing scheme(s) selected for use.

FIG. 13 shows a design of a process 1300 for sending ACK information by a UE. A data transmission sent to multiple UEs with SDMA may be received at the UE, which is one of the multiple UEs (block 1312). The data transmission may be processed to recover data sent to the UE (block 1314). ACK information (e.g., an ACK or a NAK) for the recovered data may be determined (block 1316). ACK resources for the data transmission may also be determined (block 1318). The ACK information may be mapped to a portion of the ACK resources allocated to the UE, with the multiple UEs being multiplexed on the ACK resources based on one or more multiplexing schemes, e.g., FDM and/or TDM (block 1320). Modulation may be performed on the mapped ACK information based on SC-FDM (block 1322).

For block 1318, the location and/or amount of ACK resources may be determined based on the location and/or amount of downlink resources used for the data transmission. The amount of ACK resources allocated to the UE may be determined based on the number of layers sent in the data transmission. The data transmission may comprise M layers for M UEs. The ACK resources may be partitioned into M portions (e.g., with FDM and/or TDM), and each layer may be associated with a respective portion of the ACK resources. The portion of the ACK resources allocated to the UE may be determined based on a particular layer sent to the UE.

For block 1320, the ACK information may be mapped to a first set of at least one subcarrier in a first slot and to a second set of at least one subcarrier in a second slot. The ACK resources may be located in the first and second slots. The portion of the ACK resources allocated to the UE may comprise the first and second sets of at least one subcarrier. Alternatively, the ACK information may be mapped to a set of at least one subcarrier in one of multiple slots. The ACK resources may be located in the multiple slots, and the portion of the ACK resources allocated to the UE may comprise the set of at least one subcarrier. In general, the ACK information may be mapped to at least one subcarrier in at least one slot.

At least one pilot symbol may be mapped in each of the at least one slot, e.g., mapped to at least one resource element in the allocated portion of the ACK resources. ACK symbols for the ACK information may be mapped to remaining resource elements in the allocated portion of the ACK resources.

FIG. 14 shows a design of an apparatus 1400 for sending ACK information. Apparatus 1400 includes means for receiving at a UE a data transmission sent to multiple UEs with SDMA (module 1412), means for processing the data transmission to recover data sent to the UE (module 1414), means for determining ACK information for the recovered data (module 1416), means for determining ACK resources for the data transmission (module 1418), means for mapping the ACK information to a portion of the ACK resources allocated to the UE, with the multiple UEs being multiplexed on the ACK resources (module 1420), and means for performing modulation on the mapped ACK information based on SC-FDM (module 1422).

Figure 15:
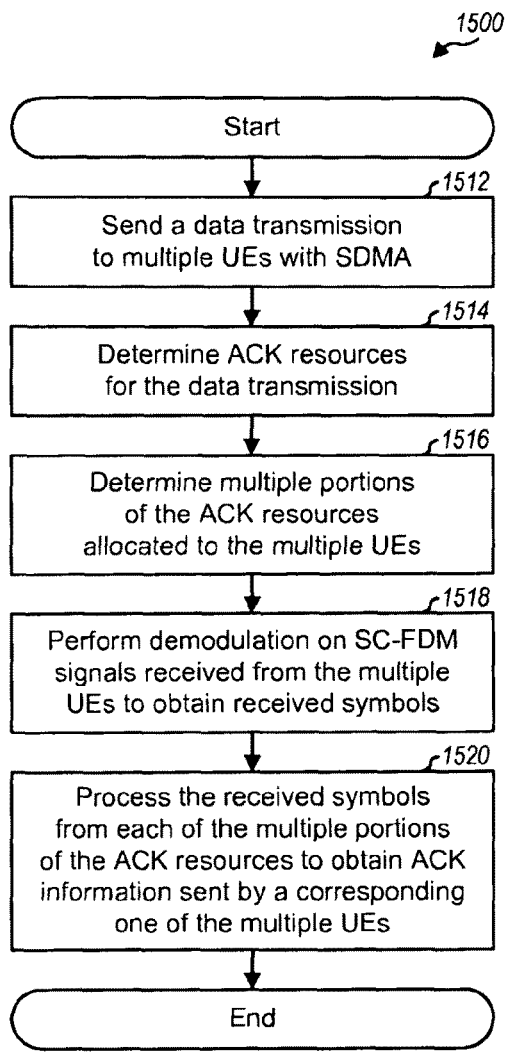
FIG. 15 shows a process for receiving ACK information from UEs.

FIG. 15 shows a design of a process 1500 for receiving ACK information from UEs at a base station, e.g., an eNB. A data transmission may be sent to multiple UEs with SDMA (block 1512). ACK resources for the data transmission may be determined (block 1514). Multiple portions of the ACK resources allocated to the multiple UEs (e.g., based on FDM and/or TDM) may be determined (block 1516). Demodulation may be performed on SC-FDM signals received from the multiple UEs to obtain received symbols (block 1518). The received symbols from each of the multiple portions of the ACK resources may be processed to obtain ACK information sent by a corresponding one of the multiple UEs (block 1520).

The portion of ACK resources allocated to each UE may comprise first and second sets of at least one subcarrier in first and second slots, respectively. In this case, received symbols may be obtained from the first set of at least one subcarrier in the first slot and also from the second set of at least one subcarrier in the second slot. The portion of ACK resources allocated to each UE may comprise a set of at least one subcarrier in one of multiple slots. In this case, received symbols may be obtained from the set of at least one subcarrier in the one slot.

For each UE, at least one received pilot symbol may be obtained from at least one resource element in the portion of the ACK resources allocated to that UE. Channel gain estimates may be derived based on the at least one received pilot symbol. Received ACK symbols may be obtained from remaining resource elements in the allocated portion of the ACK resources. Detection may be performed on the received ACK symbols with the channel gain estimates to obtain detected symbols. The detected symbol may be processed to obtain the ACK information sent by the UE.

Figure 16:
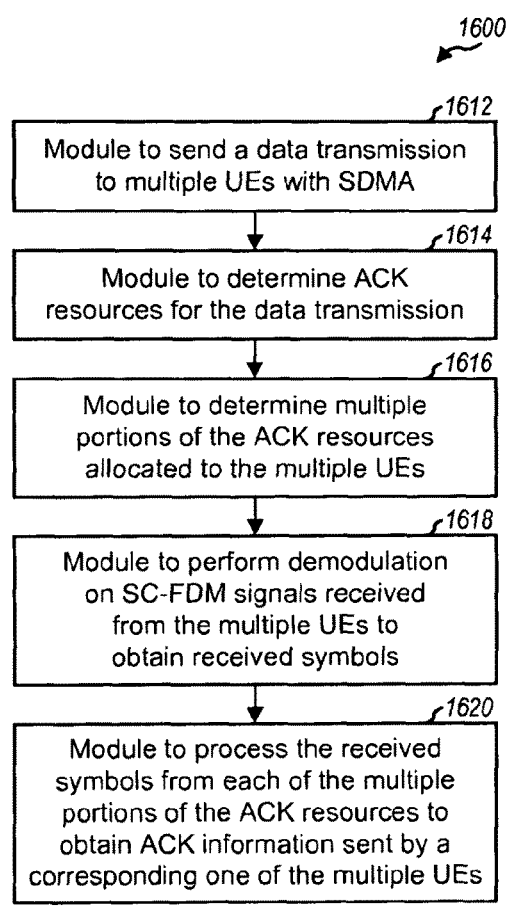
FIG. 16 shows an apparatus for receiving ACK information.

FIG. 16 shows a design of an apparatus 1600 for receiving ACK information. Apparatus 1600 includes means for sending a data transmission to multiple UEs with SDMA (module 1612), means for determining ACK resources for the data transmission (module 1614), means for determining multiple portions of the ACK resources allocated to the multiple UEs (module 1616), means for performing demodulation on SC-FDM signals received from the multiple UEs to obtain received symbols (module 1618), and means for processing the received symbols from each of the multiple portions of the ACK resources to obtain ACK information sent by a corresponding one of the multiple UEs (module 1620).

The modules in FIGS. 14 and 16 may comprise processors, electronics devices, hardware devices, electronics components, logical circuits, memories, etc., or any combination thereof.

Figure 17:
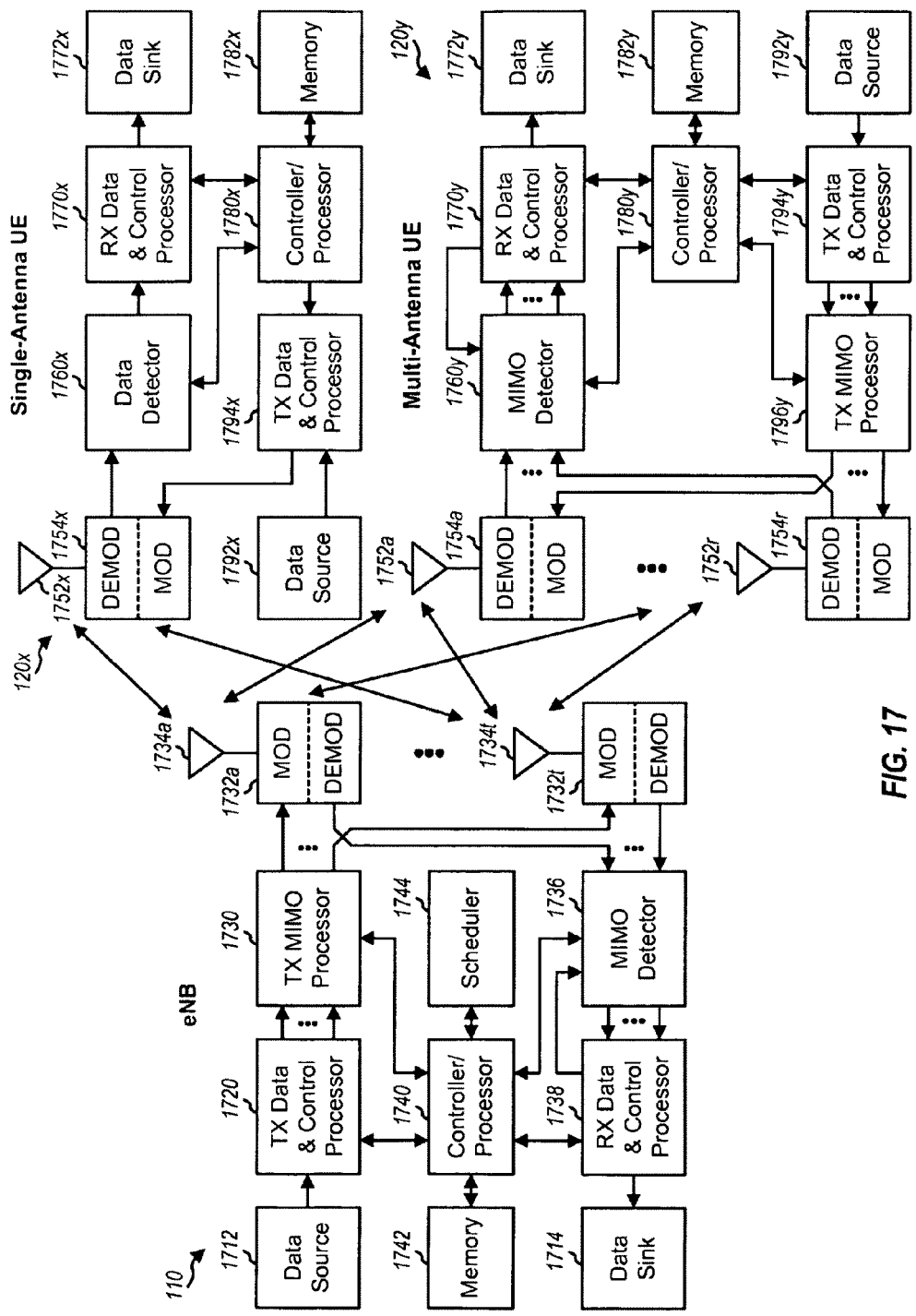
FIG. 17 shows a block diagram of one eNB and two UEs.

FIG. 17 shows a block diagram of one eNB 110 and two UEs 120x and 120y. eNB 110 is equipped with multiple (T) antennas 1734a through 1734t. UE 120x is equipped with a single antenna 1752x. UE 120y is equipped with multiple (R) antennas 1752a through 1752r. Each antenna may be a physical antenna or an antenna array.

At eNB 110, a TX data and control processor 1720 may receive traffic data from a data source 1712 for one or more UEs being served. Processor 1720 may process (e.g., format, encode, interleave, and symbol map) the traffic data for each UE based on a modulation and coding scheme selected for that UE to obtain data symbols. Processor 1720 may also receive and process control information and generate control symbols. Processor 1720 may also generate and multiplex pilot symbols with the data symbols and control symbols. A data symbol is a symbol for data, a control symbol is a symbol for control information, a pilot symbol is a symbol for pilot, and a symbol is typically a complex value. The data, control and pilot symbols may be modulation symbols from a modulation scheme such as PSK or QAM. Pilot is data that is known a priori by both the eNB and the UEs.

A TX MIMO processor 1730 may process the symbols from processor 1720. Processor 1730 may perform direct MIMO mapping, precoding/beamforming, etc. A data symbol may be sent from one antenna for direct MIMO mapping or from multiple antennas for precoding/beamforming. Processor 1730 may provide T output symbol streams to T modulators (MOD) 1732a through 1732t. Each modulator 1732 may process its output symbol stream (e.g., for OFDM) to obtain an output chip stream. Each modulator 1732 may further condition (e.g., convert to analog, filter, amplify, and upconvert) its output chip stream and generate a downlink signal. T downlink signals from modulators 1732a through 1732t may be transmitted from T antennas 1734a through 1734t, respectively.

At each UE 120, one or multiple antennas 1752 may receive the downlink signals from eNB 110. Each antenna 1752 may provide a received signal to a respective demodulator (DEMOD) 1754. Each demodulator 1754 may condition (e.g., filter, amplify, downconvert, and digitize) its received signal to obtain samples and may further process the samples (e.g., for OFDM) to obtain received symbols.

At single-antenna UE 120x, a data detector 1760x may perform data detection (e.g., matched filtering or equalization) on the received symbols and provide symbol estimates. An RX data and control processor 1770x may process (e.g., symbol demap, deinterleave, and decode) the symbol estimates to obtain decoded data and control information. At multi-antenna UE 120y, a MIMO detector 1760y may perform MIMO detection on the received symbols and provide symbol estimates. An RX data processor 1770y may process the symbol estimates to obtain decoded data and control information.

UEs 120x and 120y may transmit traffic data and/or control information on the uplink to eNB 110. The control information may comprise ACK, CQI, etc. At each UE 120, traffic data from a data source 1792 and control information (e.g., ACK, CQI, etc.) from a controller/processor 1780 may be processed by a TX data and control processor 1794 and further processed by a TX MIMO processor 1796 (if applicable) to obtain one or more output symbol streams. One or more modulators 1754 may process the output symbol stream(s) (e.g., for SC-FDM) to obtain one or more output chip streams and may further condition the output chip stream(s) to obtain one or more uplink signals, which may be transmitted via one or more antennas 1752. At eNB 110, the uplink signals from UEs 120x and 120y may be received by antennas 1734a through 1734t, conditioned and processed by demodulators 1732a through 1732t, and further processed by a MIMO detector 1736 and an RX data and control processor 1738 to recover the traffic data and control information sent by the UEs.

Controllers/processors 1740, 1780x and 1780y may direct the operation at eNB 110 and UEs 120x and 120y, respectively. Memories 1742, 1782x and 1782y may store data and program codes for eNB 110 and UEs 120x and 120y, respectively. A scheduler 1744 may schedule UEs for downlink and/or uplink transmission and may provide assignments of resources for the scheduled UEs.

Figure 18:
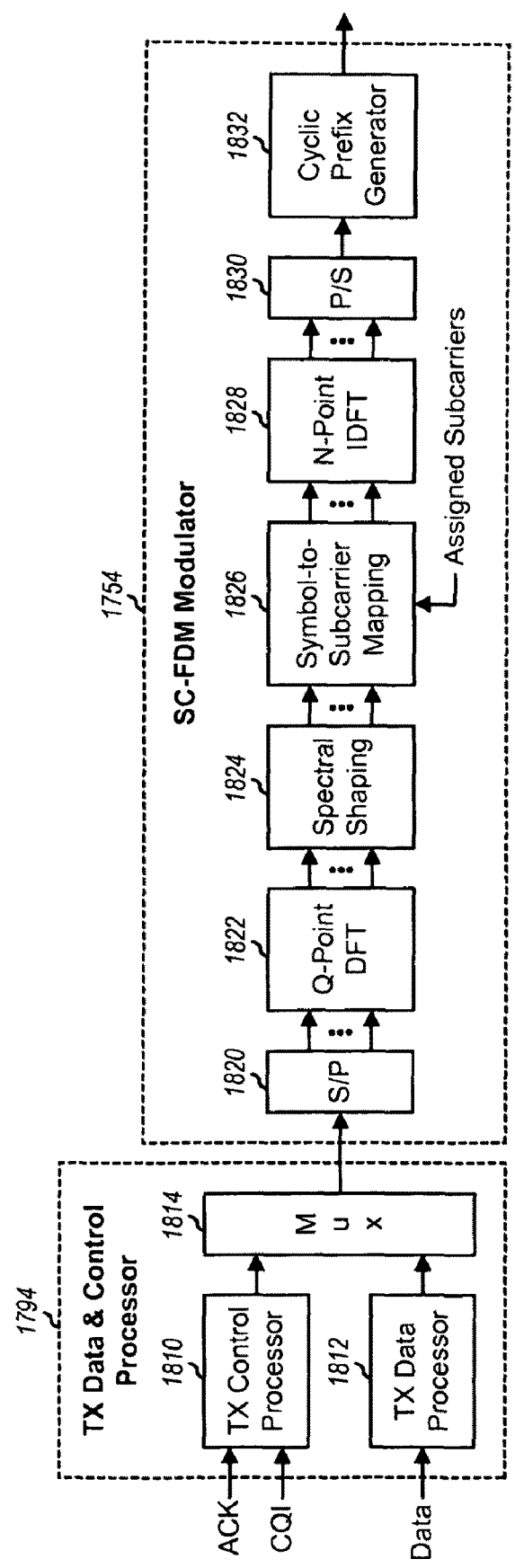
FIG. 18 shows a transmit (TX) data and control processor and a modulator.

FIG. 18 shows a block diagram of a design of a TX data and control processor 1794 and an SC-FDM modulator 1754. Processor 1794 may be used for each of processor 1794x and 1794y in FIG. 17. Modulator 1754 may be used for each of modulators 1754a through 1754r and modulator 1754x in FIG. 17.

Within processor 1794, a TX control processor 1810 may receive and process CQI and/or ACK information being sent in a subframe. In one design, if only ACK information is being sent, then processor 1810 may generate an ACK symbol for an ACK or a NAK for each layer, e.g., by mapping an ACK to one QPSK value and a NAK to another QPSK value. Processor 1810 may then repeat the ACK symbol for each layer to obtain one symbol for each resource element used to send the ACK. In another design, processor 1810 may generate ACK symbols for each layer based on a CAZAC (constant amplitude zero auto correlation) sequence such as a Zardoff-Chu sequence, a generalized chirp-like (GCL), etc. If only CQI information is being sent, then processor 1810 may encode the CQI information to obtain code bits and then map the code bits to modulation symbols. If both CQI and ACK are being sent, then processor 1810 may jointly encode the CQI and ACK information to obtain code bits and then map the code bits to modulation symbols. Alternatively, processor 1810 may separately process the CQI and ACK information and then multiplex the modulation symbols for CQI and ACK. Processor 1810 may also generate modulation symbols for CQI and/or ACK in other manners.

A TX data processor 1812 may receive and encode data based on a coding scheme to obtain code bits, interleave the code bits, and map the interleaved bits to modulation symbols based on a modulation scheme. A multiplexer (Mux) 1814 may multiplex the symbols from processors 1810 and 1812. The symbols from multiplexer 1814 may be processed by TX MIMO processor 1796y at UE 120y (not shown in FIG. 18).

Modulator 1754 may perform SC-FDM on the output symbols from processor 1794 (as shown in FIG. 18) or processor 1796y (not shown in FIG. 18). Within modulator 1754, a serial-to-parallel converter (S/P) 1820 may receive output symbols and provide Q output symbols in each symbol period, where Q is the number of subcarriers being used for transmission. A discrete Fourier transform (DFT) unit 1822 may perform a Q-point DFT on the Q output symbols and provide Q frequency-domain symbols. A spectral shaping unit 1824 may perform spectral shaping on the Q frequency-domain symbols and provide Q spectrally shaped symbols. A symbol-to-subcarrier mapping unit 1826 may map the Q spectrally shaped symbols to Q subcarriers used for transmission and may map zero symbols to the remaining subcarriers. An inverse DFT (IDFT) unit 1828 may receive N mapped symbols for the N total subcarriers, perform an N-point IDFT on these N symbols, and provide N time-domain output chips. A parallel-to-serial converter (P/S) 1830 may serialize the N output chips and provide a useful portion of an SC-FDM symbol. A cyclic prefix generator 1832 may copy the last C output chips of the useful portion and append these C output chips to the front of the useful portion to form an SC-FDM symbol containing N+C output chips. The SC-FDM symbol may be sent in one SC-FDM symbol period, which may be equal to N+C chip periods.

Figure 19:
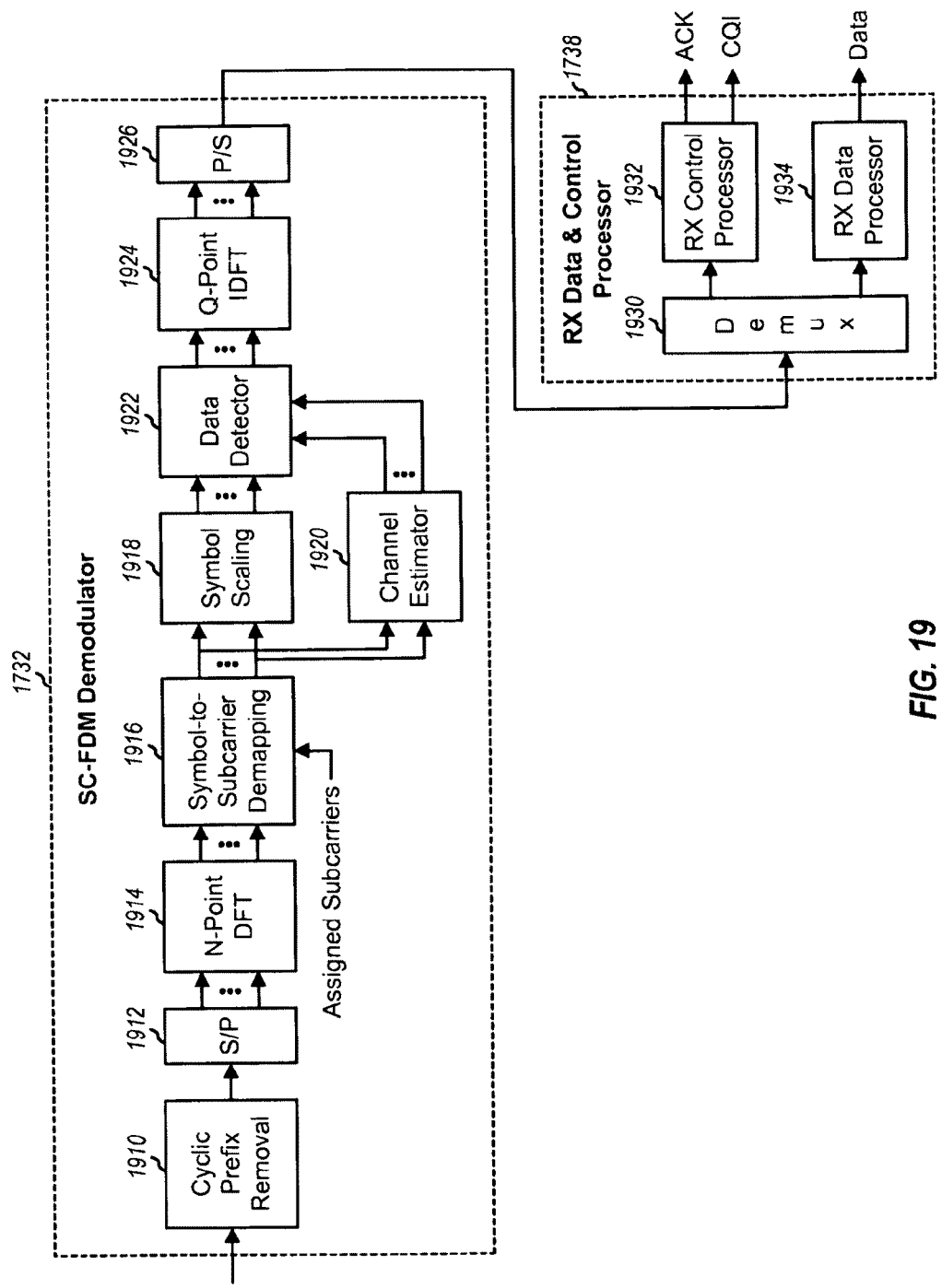
FIG. 19 shows a demodulator and a receive (RX) data and control processor.

FIG. 19 shows a block diagram of a design of an SC-FDM demodulator 1732 and an RX data and control processor 1738. Demodulator 1732 may be used for each of demodulators 1732a through 1732t in FIG. 17. Within demodulator 1732, a cyclic prefix removal unit 1910 may obtain N+C received samples in each SC-FDM symbol period, remove C received samples corresponding to the cyclic prefix, and provide N received samples for the useful portion of a received SC-FDM symbol. An S/P 1912 may provide the N received samples in parallel. A DFT unit 1914 may perform an N-point DFT on the N received samples and provide N received symbols for the N total subcarriers. These N received symbols may contain data and control information from all UEs transmitting to eNB 110. The processing to recover control information and/or data from one UE is described below.

A symbol-to-subcarrier demapping unit 1916 may provide Q received symbols from the Q subcarriers used by the UE and may discard the remaining received symbols. Unit 1916 may provide received data and/or control symbols to a unit 1918 and provide received pilot symbols to a channel estimator 1920. Channel estimator 1920 may derive channel gain estimates based on the received pilot symbols. Unit 1918 may scale the received data and/or control symbols based on the spectral shaping performed by the UE. A data detector 1922 may perform data detection (e.g., matched filtering, equalization, etc.) on the scaled symbols with the channel gain estimates and provide Q detected symbols. An IDFT unit 1924 may perform a Q-point IDFT on the Q detected symbols and provide Q demodulated symbols. A P/S 1926 may serialize the demodulated symbols.

Within processor 1738, a demultiplexer 1930 may provide demodulated symbols for control information to an RX control processor 1932 and provide demodulated symbols for data to an RX data processor 1934. RX control processor 1932 may process its demodulated symbols and provide decoded control information, e.g., ACK and/or CQI. RX data processor 1934 may process (e.g., symbol demap, deinterleave, and decode) its demodulated symbols and provide decoded data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to:
receive at a user equipment (UE) a data transmission sent to multiple UEs with spatial division multiple access (SDMA);
process the data transmission to recover data sent to the UE;
determine acknowledgement (ACK) information for the recovered data;
determine ACK resources for the data transmission, the ACK resources including a plurality of subframes, wherein each subframe includes a plurality of slots, and wherein each slot is divided into a plurality of subcarriers with multiple symbol periods;
map the ACK information to a portion of the ACK resources allocated to the UE, wherein the multiple UEs are multiplexed on the ACK resources over both the plurality of subcarriers and multiple symbol periods in the plurality of slots; and
perform modulation on the mapped ACK information based on single-carrier frequency division multiplexing (SC-FDM), wherein the multiple UEs are multiplexed on the ACK resources; and
a memory coupled to the at least one processor.

2. The apparatus of claim 1, wherein the multiple UEs are frequency division multiplexed on the ACK resources.

3. The apparatus of claim 1, wherein the multiple UEs are time division multiplexed on the ACK resources.

4. The apparatus of claim 1, wherein the at least one processor is configured to determine location of the ACK resources based on location of downlink resources used for the data transmission.

5. The apparatus of claim 1, wherein the at least one processor is configured to determine an amount of ACK resources allocated to the UE based on an amount of downlink resources used for the data transmission.

6. The apparatus of claim 1, wherein the at least one processor is configured to determine an amount of ACK resources allocated to the UE based on a number of layers sent in the data transmission.

7. The apparatus of claim 1, wherein the data transmission comprises multiple (M) layers for the multiple UEs, wherein the ACK resources are partitioned into M portions, and wherein each layer is associated with a respective portion of the ACK resources.

8. The apparatus of claim 7, wherein the at least one processor is configured to determine the portion of the ACK resources allocated to the UE based on a particular layer sent to the UE.

9. The apparatus of claim 1, wherein the at least one processor is configured to map the ACK information to a first set of at least one subcarrier in a first slot and to a second set of at least one subcarrier in a second slot, wherein the ACK resources are located in the first and second slots, and wherein the portion of the ACK resources allocated to the UE comprises the first and second sets of at least one subcarrier.

10. The apparatus of claim 1, wherein the at least one processor is configured to map the ACK information to a set of at least one subcarrier in one of multiple slots, wherein the ACK resources are located in the multiple slots, and wherein the portion of the ACK resources allocated to the UE comprises the set of at least one subcarrier.

11. The apparatus of claim 1, wherein the at least one processor is configured to map the ACK information to at least one subcarrier set in at least one slot, and to map at least one pilot symbol in each of the at least one slot.

12. The apparatus of claim 1, wherein the at least one processor is configured to map at least one pilot symbol to at least one resource element in the allocated portion of the ACK resources, and to map the ACK information to remaining resource elements in the allocated portion of the ACK resources.

13. A method for wireless communication, comprising:
receiving at a user equipment (UE) a data transmission sent to multiple UEs with spatial division multiple access (SDMA);
processing the data transmission to recover data sent to the UE;
determining acknowledgement (ACK) information for the recovered data;
determining ACK resources for the data transmission, the ACK resources comprising a plurality of subframes, wherein each subframe comprising a plurality of slots, and wherein each slot being divided into a plurality of subcarriers with multiple symbol periods;
mapping the ACK information to a portion of the ACK resources allocated to the UE, wherein the multiple UEs are multiplexed on the ACK resources over both the plurality of subcarriers and multiple symbol periods in the plurality of slots; and
performing modulation on the mapped ACK information based on single-carrier frequency division multiplexing (SC-FDM).

14. The method of claim 13, wherein the mapping the ACK information comprises mapping the ACK information to a first set of at least one subcarrier in a first slot and to a second set of at least one subcarrier in a second slot, wherein the ACK resources are located in the first and second slots, and wherein the portion of the ACK resources allocated to the UE comprises the first and second sets of at least one subcarrier.

15. The method of claim 13, wherein the mapping the ACK information comprises mapping the ACK information to a set of at least one subcarrier in one of multiple slots, wherein the ACK resources are located in the multiple slots, and wherein the portion of the ACK resources allocated to the UE comprises the set of at least one subcarrier.

16. The method of claim 13, further comprising:
mapping at least one pilot symbol to at least one resource element in the allocated portion of the ACK resources, wherein the ACK information is mapped to remaining resource elements in the allocated portion of the ACK resources.

17. The method of claim 13, wherein the data transmission comprises multiple (M) layers for the multiple UEs, wherein the ACK resources are partitioned into M portions, and wherein each layer is associated with a respective portion of the ACK resources.

18. An apparatus for wireless communication, comprising:
means for receiving at a user equipment (UE) a data transmission sent to multiple UEs with spatial division multiple access (SDMA);
means for processing the data transmission to recover data sent to the UE;
means for determining acknowledgement (ACK) information for the recovered data;
means for determining ACK resources for the data transmission, the ACK resources including a plurality of subframes, wherein each subframe includes a plurality of slots, and wherein each slot is divided into a plurality of subcarriers with multiple symbol periods;

means for mapping the ACK information to a portion of the ACK resources allocated to the UE, wherein the multiple UEs are multiplexed on the ACK resources over both the plurality of subcarriers and multiple symbol periods in the plurality of slots; and means for performing modulation on the mapped ACK information based on single-carrier frequency division multiplexing (SC-FDM).

19. The apparatus of claim 18, wherein the means for mapping the ACK information comprises means for mapping the ACK information to a first set of at least one subcarrier in a first slot and to a second set of at least one subcarrier in a second slot, wherein the ACK resources are located in the first and second slots, and wherein the portion of the ACK resources allocated to the UE comprises the first and second sets of at least one subcarrier.

20. The apparatus of claim 18, wherein the means for mapping the ACK information comprises means for mapping the ACK information to a set of at least one subcarrier in one of multiple slots, wherein the ACK resources are located in the multiple slots, and wherein the portion of the ACK resources allocated to the UE comprises the set of at least one subcarrier.

21. The apparatus of claim 18, further comprising:
means for mapping at least one pilot symbol to at least one resource element in the allocated portion of the ACK resources, wherein the ACK information is mapped to remaining resource elements in the allocated portion of the ACK resources.

22. The apparatus of claim 18, wherein the data transmission comprises multiple (M) layers for the multiple UEs, wherein the ACK resources are partitioned into M portions, and wherein each layer is associated with a respective portion of the ACK resources.

23. The apparatus of claim 22, further comprising means for determining the portion of the ACK resources allocated to the UE based on a particular layer sent to the UE.

24. A non-transitory machine-readable storage medium comprising instructions which, when executed by a machine, cause the machine to perform operations including:
receiving at a user equipment (UE) a data transmission sent to multiple UEs with spatial division multiple access (SDMA);
processing the data transmission to recover data sent to the UE; determining acknowledgement (ACK) information for the recovered data; determining ACK resources for the data transmission, the ACK resources including a plurality of subframes, wherein each subframe includes a plurality of slots, and wherein each slot is divided into a plurality of subcarriers with multiple symbol periods;
mapping the ACK information to a portion of the ACK resources allocated to the UE, wherein the multiple UEs are multiplexed on the ACK resources over both the plurality of subcarriers and multiple symbol periods in the plurality of slots; and performing modulation on the mapped ACK information based on single-carrier frequency division multiplexing (SC-FDM).

25. An apparatus for wireless communication, comprising:
at least one processor configured to:
send a data transmission to multiple user equipments (UEs) with spatial division multiple access (SDMA);
determine acknowledgement (ACK) resources for the data transmission;
determine multiple portions of the ACK resources allocated to the multiple UEs;
perform demodulation on single-carrier frequency division multiplex (SC-FDM) signals received from the multiple UEs to obtain received symbols;
process received symbols from each of the multiple portions of the ACK resources to obtain ACK information sent by a corresponding one of the multiple UEs, wherein for each UE the at least one processor is configured to:
obtain at least one received pilot symbol from at least one resource element in the portion of the ACK resources allocated to the UE;
derive channel gain estimates based on the at least one received pilot symbol;
obtain received ACK symbols from remaining resource elements in the portion of the ACK resources allocated to the UE;
perform detection on the received ACK symbols with the channel gain estimates to obtain detected symbols; and
process the detected symbol to obtain the ACK information sent by the UE; and
a memory coupled to the at least one processor.

26. The apparatus of claim 25, wherein the data transmission comprises multiple (M) layers for the multiple UEs, wherein the ACK resources are partitioned into M portions, and wherein each layer is associated with a respective portion of the ACK resources.

27. The apparatus of claim 26, wherein the at least one processor is configured to determine the portion of the ACK resources allocated to each UE based on a particular layer sent to the UE.

28. The apparatus of claim 25, wherein for each UE the at least one processor is configured to obtain received symbols from a first set of at least one subcarrier in a first slot and from a second set of at least one subcarrier in a second slot, and to process the received symbols to obtain the ACK information sent by the UE, wherein the ACK resources are located in the first and second slots, and wherein the portion of the ACK resources allocated to the UE comprises the first and second sets of at least one subcarrier.

29. The apparatus of claim 25, wherein for each UE the at least one processor is configured to obtain received symbols from a set of at least one subcarrier in one of multiple slots, and to process the received symbols to obtain the ACK information sent by the UE, wherein the ACK resources are located in the multiple slots, and wherein the portion of the ACK resources allocated to the UE comprises the set of at least one subcarrier.

30. A method for wireless communication, comprising:
sending a data transmission to multiple user equipments (UEs) with spatial division multiple access (SDMA);
determining acknowledgement (ACK) resources for the data transmission;
determining multiple portions of the ACK resources allocated to the multiple UEs;
performing demodulation on single-carrier frequency division multiplex (SC-FDM) signals received from the multiple UEs to obtain received symbols; and
processing received symbols from each of the multiple portions of the ACK resources to obtain ACK information sent by a corresponding one of the multiple UEs, wherein the processing the received symbols includes, for each UE:

obtaining at least one received pilot symbol from at least one resource element in the portion of the ACK resources allocated to the UE;

obtaining received ACK symbols from remaining resource elements in the portion of the ACK resources allocated to the UE;

deriving channel gain estimates based on the at least one received pilot symbol;

performing detection on the received ACK symbols with the channel gain estimates to obtain detected symbols; and processing the detected symbol to obtain the ACK information sent by the UE.

31. The method of claim 30, wherein the processing the received symbols comprises, for each UE, obtaining received symbols from a first set of at least one subcarrier in a first slot and from a second set of at least one subcarrier in a second slot, wherein the ACK resources are located in the first and second slots, and wherein the portion of the ACK resources allocated to the UE comprises the first and second sets of at least one subcarrier.

32. The method of claim 30, wherein the processing the received symbols comprises, for each UE, obtaining received symbols from a set of at least one subcarrier in one of multiple slots, wherein the ACK resources are located in the multiple slots, and wherein the portion of the ACK resources allocated to the UE comprises the set of at least one subcarrier.

33. An apparatus for wireless communication, comprising:

means for sending a data transmission to multiple user equipments (UEs) with spatial division multiple access (SDMA);

means for determining acknowledgement (ACK) resources for the data transmission;

means for determining multiple portions of the ACK resources allocated to the multiple UEs;

means for performing demodulation on single-carrier frequency division multiplex (SC-FDM) signals received from the multiple UEs to obtain received symbols; and means for processing received symbols from each of the multiple portions of the ACK resources to obtain ACK information sent by a corresponding one of the multiple UEs, wherein the means for processing the received symbols includes, for each UE:

means for obtaining at least one received pilot symbol from at least one resource element in the portion of the ACK resources allocated to the UE;

means for obtaining received ACK symbols from remaining resource elements in the portion of the ACK resources allocated to the UE;

means for deriving channel gain estimates based on the at least one received pilot symbol;

means for performing detection on the received ACK symbols with the channel gain estimates to obtain detected symbols; and means for processing the detected symbol to obtain the ACK information sent by the UE.

34. The apparatus of claim 33, wherein the means for processing the received symbols comprises, for each UE, means for obtaining received symbols from a first set of at least one subcarrier in a first slot and from a second set of at least one subcarrier in a second slot, wherein the ACK resources are located in the first and second slots, and wherein the portion of the ACK resources allocated to the UE comprises the first and second sets of at least one subcarrier.

35. The apparatus of claim 33, wherein the means for processing the received symbols comprises, for each UE, means for obtaining received symbols from a set of at least one subcarrier in one of multiple slots, wherein the ACK resources are located in the multiple slots, and wherein the portion of the ACK resources allocated to the UE comprises the set of at least one subcarrier.

36. A non-transitory machine-readable storage medium comprising instructions which, when executed by a machine, cause the machine to perform operations including:

sending a data transmission to multiple user equipment (UEs) with spatial division multiple access (SDMA);

determining acknowledgement (ACK) resources for the data transmission; determining multiple portions of the ACK resources allocated to the multiple UEs;

performing demodulation on single-carrier frequency division multiplex (SC-FDM) signals received from the multiple UEs to obtain received symbols; and processing received symbols from each of the multiple portions of the ACK resources to obtain ACK information sent by a corresponding one of the multiple UEs, wherein the processing the received symbols includes, for each UE;

obtaining at least one received pilot symbol from at least one resource element in the portion of the ACK resources allocated to the UE;

obtaining received ACK symbols from remaining resource elements in the portion of the ACK resources allocated to the UE;

deriving channel gain estimates based on the at least one received pilot symbol;

performing detection on the received ACK symbols with the channel gain estimates to obtain detected symbols; and processing the detected symbol to obtain the ACK information sent by the UE.

* * * * *